United States Patent [19]
Ringland et al.

[11] Patent Number: 6,122,391
[45] Date of Patent: *Sep. 19, 2000

[54] SPECTRALLY COORDINATED PATTERN SEARCH-IMAGING SYSTEM AND METHOD

[75] Inventors: William K. Ringland; Jon C. Kubo, both of Walnut, Calif.

[73] Assignee: Autodesk, Inc., San Rafael, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/966,299

[22] Filed: Nov. 7, 1997

Related U.S. Application Data

[63] Continuation of application No. 08/292,514, Aug. 18, 1994, Pat. No. 5,751,829.

[51] Int. Cl.$^7$ ........................................................ G06K 9/00

[52] U.S. Cl. .............................. 382/100; 28/109; 355/81

[58] Field of Search ..................................... 382/100, 162, 382/305, 165, 189–191, 209; 395/103; 364/189, 191; 358/518; 703/1–3, 902; 355/78–84, 88; 28/109

[56] References Cited

U.S. PATENT DOCUMENTS

| | | | |
|---|---|---|---|
| 4,046,476 | 9/1977 | Charamella et al. | 355/77 |
| 4,181,954 | 1/1980 | Rosenthal et al. | 395/103 |
| 4,931,929 | 6/1990 | Sherman | 364/401 |
| 5,222,154 | 6/1993 | Graham et al. | 382/162 |
| 5,241,671 | 8/1993 | Reed et al. | 395/600 |
| 5,369,763 | 11/1994 | Biles | 707/3 |

(List continued on next page.)

FOREIGN PATENT DOCUMENTS 2 105 075   3/1983   United Kingdom .

OTHER PUBLICATIONS

Article—ColorTec–PCM (Personal Color Meter) of ColorTec Associates, Inc.

Cavanaugh, R.T., "Educational/Institutional Features of the Optical Videodisc System", *SMPTE Journal,* vol. 86, No. 4, Apr. 1977, pp. 201–203.

Riggs, L., "Direct Marketing Goes Electronic", *Sales & Marketing Mgmt.,* vol. 134, No. 1, Jan. 14, 1985, pp. 59–60.

Hoke, P., "Comp–U–Store System Could Change Retail Economics", *Direct Marketing,* vol. 46, No. 3, Jul. 1983, pp. 101–107.

(List continued on next page.)

*Primary Examiner*—Jon Chang
*Assistant Examiner*—Jayanti K. Patel
*Attorney, Agent, or Firm*—Gates & Cooper

[57] ABSTRACT

A system for selecting decorative materials is based on large numbers of high-resolution, full color images of decorative materials stored in a compressed format on an inexpensive medium such as a CD-ROM. In creating the ROM, each image is coordinated with additional information such as style of pattern, type of material, and other auxiliary information. Before final compression and storage of the image data color information is added by spectrophotometrically analyzing the decorative material. Color values for a background color and up to four foreground colors are determined. Individual colors are then referenced to a comprehensive color standard system containing a large number of standardized color swatches. Spectrophotometric color referencing allows the data records to be rapidly searched on the basis of color, as well as the other information in the record. Wallpaper patterns, drapery material, floor covering, or paint can then be rapidly selected on the basis of matching color. Various patterns and paints can be compared side by side on a high-resolution computer monitor that has been calibrated to produce an accurate color image. Finally, the chosen paints and other decorating materials can be rendered onto a room image so that the consumer can view an accurate simulation of the chosen materials.

18 Claims, 12 Drawing Sheets

U.S. PATENT DOCUMENTS

| | | | |
|---|---|---|---|
| 5,414,537 | 5/1995 | Omuro et al. | 358/518 |
| 5,458,590 | 10/1995 | Schleinz et al. | 664/361 |
| 5,465,291 | 11/1995 | Barrus et al. | 379/67.1 |
| 5,493,518 | 2/1996 | Maes et al. | 395/121 |
| 5,495,568 | 2/1996 | Beavin | 395/173 |
| 5,495,576 | 2/1996 | Ritchey | 395/125 |
| 5,524,195 | 6/1996 | Clanton, III et al. | 395/173 |
| 5,563,988 | 10/1996 | Maes et al. | 395/121 |
| 5,572,635 | 11/1996 | Takizawa et al. | 382/167 |
| 5,577,175 | 11/1996 | Naka et al. | 395/173 |

OTHER PUBLICATIONS

Gatty, B., "Setting up Shop on Computer Screens", *Nation's Business,* vol. 72, No., 3, Mar. 1984, pp. 57–58.

"Retailers Beginning to Tune in Video Displays", *Advertising Age,* Nov. 18, 1985 pp. 66.

"Videodisc: Product Search Launched for Architects and Interior Designers", *Videodisc and Optical Disk,* vol. 5, No. 4, Jul./Aug. 1985, pp. 244–247.

Merrian, M. Suzanne, et al., "An Interactive Videodisc for Visitor Information", published by Learned Information, Inc., Medford, New Jersey, 1984, pp. 195–207.

FIG. 12

SPECTRALLY COORDINATED PATTERN SEARCH-IMAGING SYSTEM AND METHOD

This application is a continuation of Ser. No. 08/292,514 filed Aug. 18, 1994 now U.S. Pat. No. 5,751,829.

BACKGROUND OF THE INVENTION

1. Field of the Invention

The present invention concerns the area of interior home fashion and, more specifically, a system which allows a database of essentially all available wallcovering patterns to be rapidly searched on the basis of exact spectral characteristics of foreground and background pattern colors, general pattern characteristics, and room characteristics to display high-resolution, color correct images of retrieved patterns, and render selected patterns onto photographic images of rooms.

2. Description of Related Art

Human beings are visually oriented mammals. Unlike many mammals whose primary senses are those of smell or hearing, our visual sense is primary; hence, sayings such as: "A picture is worth a thousand words." Furthermore, our vision is color sensitive and binocular (depth sensitive). There is no mistaking the importance of visual cues, especially those involving color, in our day-to-day existence. Many psychological studies have even purported to show that certain environmental colors provoke hostility and anxiety, while other (colors are conducive to rest or contemplation.

It is little wonder that so much time and money is spent on interior design and interior decorating. It is no mean feat to provide a room interior that is both pleasant to behold and occupy and, at the same time, in keeping with the function of the room. The various components of wall and ceiling color, wallcovering (i.e., wallpaper) color and pattern, window treatments (i.e., draperies and shades) color and pattern, floor covering color and pattern, and furniture style, color and pattern must all be properly coordinated to achieve a result that is both aesthetically pleasing and economically viable.

Perhaps the simplest way to obtain a coordinated room is to copy an acceptable design from a magazine or other published source. However, it is unlikely that a magazine design will fit the real needs of a consumer wishing to decorate a room. Furthermore, the consumer's room is unlikely to physically match the layout of the magazine room; nor is a magazine at all likely to provided coordinated designs for the other rooms of the consumer's home. Therefore, the usual method is to employ an interior designer and look at numerous paint and pattern samples in an attempt to select the ideal colors and patterns to coordinate the room design and furnishings, as well as the rooms' relationship with other rooms of the home.

A good interior designer is usually able to narrow down the range of samples that must be viewed, but such a designer is likely to be expensive. If the consumer attempts to save money by making his/her own selections, the process is apt to be arduous, time consuming and frustrating. If the consumer wishes to match the design parameters to "grandma's old brocaded chair," the process is likely to be nearly impossible.

Either the interior designer or the consumer must ultimately look at myriad patterns in sample books and then attempt to match them with appropriate paint colors and upholstery patterns and colors, etc. If grandma's furniture is being matched, the problem becomes even more difficult. While the majority of people have sensitive color vision and call recognize slight color mismatches when the colors are placed side by side, the vast majority of people have extremely poor color memories. Thus, to make an accurate match, the color to be matched must be physically present.

Moreover, the color quality of illumination can have a drastic effect on perceived colors. Most people have had the experience of purchasing an article at a store and then discovering that it appears to be a completely different color when taken home. Colors often appear completely different under the cool white fluorescent lighting of most stores than they do under incandescent lighting found in most homes.

There is a great need for a method to simplify the selection and matching process that presently goes on in the process of interior decorating. Sample books of wallcovering and other materials are expensive, cumbersome to use and, as mentioned above, inaccurate, unless actual samples of all the items are available for side-by-side comparison.

There have been a few attempts to utilize modern technology, such as personal computers, to improve upon the present system. Typical text-oriented databases have been used to simplify the selection problem and to track the expensive and bulky sample books. These systems are based on written descriptions of pattern structure and color. They allow the designer or consumer to search the database using a description and desired color. The program produces a list of possible patterns, along with sample book page numbers, so the actual sample can be located. The program also maintains a list of available sample books and who may have checked them out (rather like a library lending system).

However, such systems do not eliminate expensive and cumbersome sample books. All they do is suggest which books should be examined. As mentioned above, color descriptions are liable to be faulty, so that the suggested patterns may be useless even if the required sample book is available.

Another computer approach is "rendering," in which an image of a room can be altered (rendered) by the computer so that the walls, floors, and window coverings take on the appearance of desired patterns complete with natural shadows and distortions caused by perspective. Thus, the computer can make a room image give the effect of the materials chosen by the designer or the consumer. This is an ideal way to visualize a combination of patterned materials after they have been chosen. However, it does little to narrow down the gigantic number of samples from which to choose. There is generally no guarantee that the spectral results will be accurate. Furthermore, presently-available systems have only a limited universe of patterns from which to chose, since only a few hundred patterns out of the tens of thousands available are built into the systems. This means that while the present systems might be good at showing what a particular class of pattern (i.e., stripped patterns) will look like, they are unable to show the appearance of a particular pattern chosen from the sample books because they can render only the small number of patterns actually built into the particular system.

OBJECTS AND SUMMARY OF THE INVENTION

It is an object of the present invention to provide a method and device that makes it easy to make a choice from the many thousands of patterns available in decorative materials without having to depend on costly and bulky sample books;

It is an additional object of the present invention to make the choice rapid, as well as easy;

It is a further object of the present invention that the choice is made using actual spectral information so that chosen colors match exactly;

It is another object of the present invention that the choice can be made on several foreground colors as well as a background color of each pattern;

It is a still further object of the present invention that the choice can also be based on a general description of pattern type;

It is an additional object of the present invention that a pattern chosen by the system can be instantly displayed in a high-resolution, spectrally correct image;

It is another object of the present invention to automatically display commercially-available paints that match the spectral characteristics of the chosen pattern;

It is a further object of the present invention that chosen patterns as well as paint colors can be accurately rendered onto actual room images;

It is an additional object of the present invention to provider means whereby an accurate spectral reading can be taken of any object so it can be correctly matched by the system; and It is a still further object of the present invention that updates containing large numbers of new materials can be inexpensively provided to each user within a short time of the materials' availability.

These and other objects are provided by a system in which large numbers of high-resolution, full color images of decorative patterns are stored in a compressed format on an inexpensive medium such as a CD-ROM. Each pattern is combined with additional information such as style of pattern, type of material, and other auxiliary information important for selection. Before final compression and storage color information is added, the patterns are analyzed spectrophotometrically and color values for a background color and up to four foreground colors are determined. Individual colors are referenced to a comprehensive color standard system such as the Pantone Textile Color Guide. The Paintone system was selected because ii contains a large number (1701) of color swatches, is widely available and widely used, and has a relatively inexpensive paper fan deck available (about $50.00). Other color reference systems including a unique custom system for use only with the present invention could be used instead of the Pantone system.

Spectrophotometric color referencing allows the pattern records to be rapidly searched on the basis of color, as well as the other information in the record. Wallpaper patterns, drapery material, floor covering, or paint can then be rapidly selected on the basis of matching color. Various patterns and paints can be compared side by side on a high-resolution computer monitor that has been calibrated to produce an accurate color image. Finally, the chosen paints and other decorating materials can be rendered onto a room image so that the consumer can view an accurate simulation of the chosen materials.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 12 is a diagram of a "Pantone Colors" screen from the Advanced Detailed Search with overlapping Color Range screen that forms a part of the operations illustrated in FIG. 4.

DETAILED DESCRIPTION OF THE PREFERRED EMBODIMENTS

Figure 1:
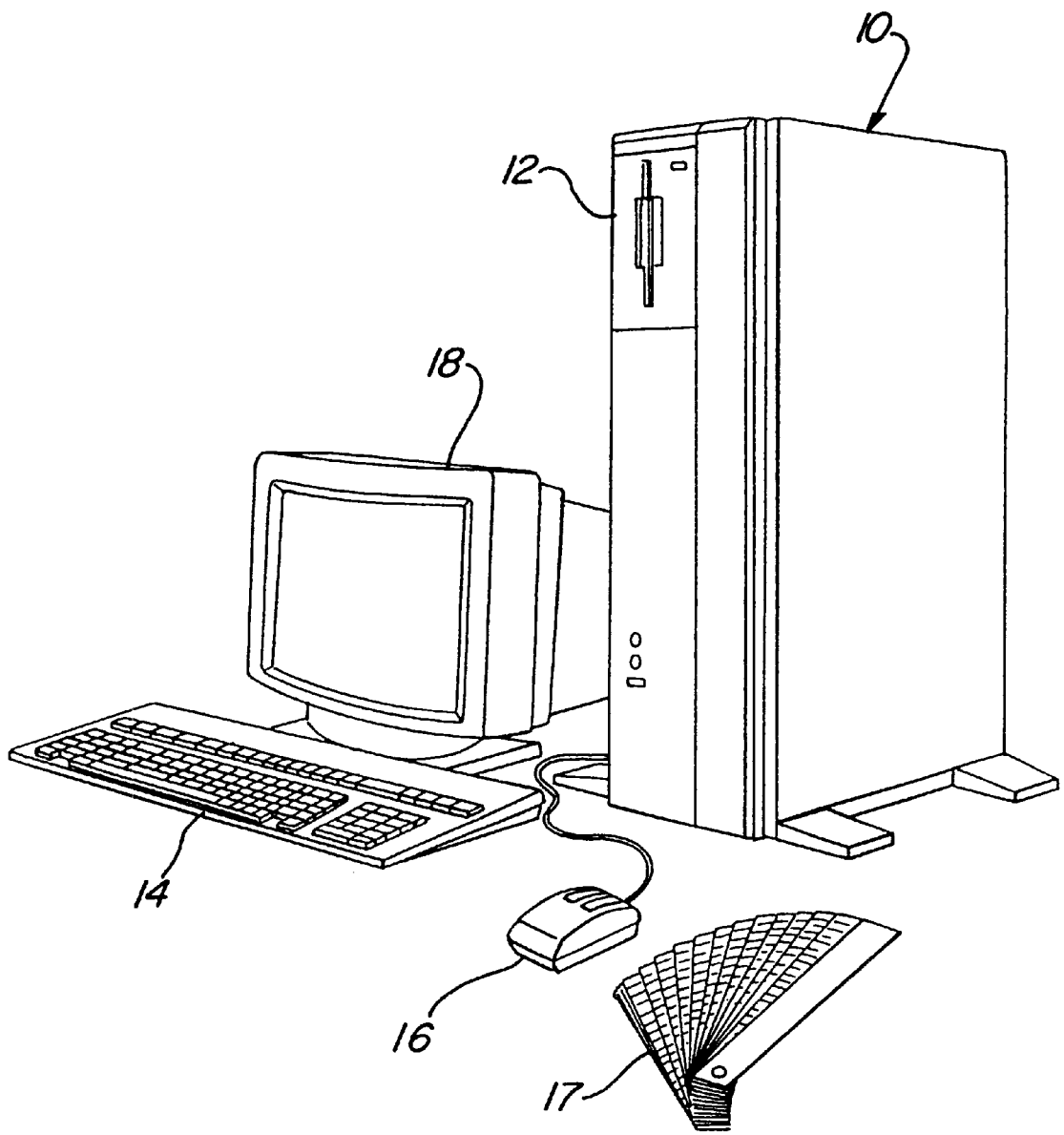
FIG. 1 is a perspective view of the computer system used with the present invention.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a system and method for rapidly selecting arid viewing decorative materials such as wallcovering materials based on spectral characteristics of the materials and a color accurate display of the material on a computer monitor.

The example and discussion herein disclose the application of precision color selection through spectrophotometric matching which makes possible accurate selection and coordination of multiple related products. The example is given in terms of wallpaper which may be cross-referenced to fabrics, window treatments and flooring. However, the basic method of the present invention is to accurately store the pattern and color of an object along with precise color characterizations so that patterns and colors of the object and related multiple products can be rapidly displayed and selected. The present invention is, therefore, also suitable for selecting fabrics to be used in manufacturing of clothing and at the same time discovering and selecting other products such as footwear, belts, accessories and ties that match or coordinate. In this way entire lines of multiple products can be rapidly specified and ordered.

A normal method of selecting and coordinating decorative materials such as wallcovering materials, floor covering materials, upholstery fabrics, and window treatments is the use of so-called sample books. Typically, distributors of wallpaper or floor coverings annually produce sample books showing all of their new patterns. Such sample books contain actual samples of each different pattern and usually the "color way" (same pattern in different color combinations) samples for the pattern. The samples may be arranged by color or by pattern type. Usually each sample book will contain patterns that are related by overall style or type of typical room use (i.e., kitchen patterns and children's room patterns). In addition, the sample books contain photographs of suggested room designs incorporating the decorative materials sampled by the book. The sample books also contain other information needed to actually use the decorative material: pattern number, dimensions of rolls, type of base material, type of adhesive required, washability, cost, availability of coordinated materials, etc.

Naturally the process of producing sample books is very expensive. Not only do the books entail considerable expense in layout, photography, and printing; the inclusion of actual sample of the wallpapers is quite expensive. Each principal manufacturer may have around 15,000 available patterns. Since a run of sample books containing only about 100–200 samples costs roughly $1 million to produce, the industry-wide cost for sample books is many millions of dollars annually. The distributor or manufacturers pass the expense to the distributors and the dealers that actually use the sample books. Because the books are so expensive, some patterns appear only once in a single sample book. This book may be intended to last as long as the pattern is available. Normally only one edition of a given sample book is manufactured; when the copies are exhausted, no more will be available. If the book is damaged or lost, then that dealer may be unable to demonstrate a particular pattern.

Due to the expense and bulk of the sample books, many dealers can carry only a few distributors' lines, and often for only part of the lines they do carry. Although the current invention is much more than merely a replacement for decorative material sample books, it can and does operate a, a replacement and, as such, is subject to many of the quality constraints inherent in sample book. That is to say, if the invention is to be used in place of the sample books, it must be capable of providing high-resolution images of excellent color fidelity so that the consumer or the designer viewing the image obtains much of the same impression they would obtain from viewing the actual material in a sample book. In addition, the invention must provide the other information found in the sample book, such as roll size, price, material, and installation information.

Modern computer systems are capable of displaying images in high resolution and in full color on an appropriate monitor. However, most of such computer imaging has not been overly concerned with color fidelity. Nevertheless, the present invention has succeeded in producing reliable color images with sufficient color fidelity to replace sample books. The achieving of these results depends on several key items and processes.

First, the specifications of the computer system used to display the end results are important. There will necessarily be some compromise between cost and capability of the system. Economic factors and overall availability dictate the use of an IBM compatible system with adequate memory and hard disc storage. Because color images necessarily involve massive amounts of data, a microprocessor of high speed is necessary. The speed of economical microprocessors is rapidly increasing; a minimum requirement for the present invention is a "486" microprocessor. A PENTIUM microprocessor operating at at least 60 MHz is preferred. A hard disk of at least 540 MB is preferred. A video adaptor with 2 MB of VRAM (video memory) is preferred. FIG. 1 shows a setup useful in the present invention. A system unit (10) contains the microprocessor, hard disc drive, CD-ROM drive (12) and support electronics. A keyboard (14) and a mouse (16) are provided for user input. A high-resolution color monitor (18) such as a NEC 17-inch Multi Sync 5FG is preferred. A fan deck (17) of a color reference system is shown with the setup since the user may wish to refer to actual color swatches or check the accuracy of the monitor's display.

Accurate display of color demands a color video board capable of reproducing a sufficient number of colors. The present invention requires the ability to reproduce over 16 million different colors. The system uses a high-resolution monitor that is driven by a 24-bit color adaptor board which produce an 800×600 pixel image. It is most important that the color monitor be properly calibrated so that it can accurately reproduce an image. There are a number of different ways to ensure accurate color imaging. The most complex systems use a photosensitive probe that measures a region of the image on the face of the monitor and then enables automatic or manual adjustment of the monitor. Unfortunately, such devices are complex and expensive. As will be detailed below, the present invention uses the color reference system to standardize color information. Therefore, an effective way to check monitor calibration is to display a number of fields of color that are supposed to match swatches of the color reference system. The user simply holds the required swatches next to the monitor image and determines whether they match the imaged colors. If the match is good, then color fidelity of the monitor is deemed to be adequate.

Equally important to ensuring accuracy of the display device is ensuring accuracy of the data that is to be displayed. That is to say, a correctly calibrated monitor given inaccurate image data will necessarily produce an incorrect image. Therefore, the present invention encompasses a method for ensuring color accuracy of the image data of the decorative materials. As a first step, all color monitors used for the quality control of the image data are rigorously calibrated. Photosensor methods well known in the art are employed to guarantee that the monitors will correctly and consistently display the image data.

The image data itself is produced by using a specialized color sensor known as a scanner, a device that resembles a photocopy machine; flat materials to be scanned are placed on a transparent top surface and covered by a lid. Like the color monitor, the scanner is calibrated before use so that it will produce results that are as accurate as possible. The scanner produces a color bit map of the scanned object. Alternately, when the decorative material cannot fit into the scanner or when the object has three-dimensional relief that would be crushed or distorted by the scanner, a high-resolution television camera can be used to produce a signal from which a color bit map is derived.

The computer is able to display the color bit map data as a full color image of the decorative material with sufficient resolution for the consumer's or designer's purposes. It is possible to produce color bit maps of several different resolutions. The higher the resolution, the larger the number of pixels displayed to form the image. An image with considerable fine detail will require many pixels to produce an adequate display. On the other hand, a fairly simple pattern can be adequately displayed by a lower resolution bit map which contains fewer pixels. As will be discussed below, there are cogent reasons to produce bit maps of the lowest possible resolution, because such maps take up less room on a mass storage device. Therefore, image data is produced at the lowest resolution that is consistent with a displayed image of adequate quality.

However, the accuracy of the displayed image's color is easily as important as the image's resolution. If the system displays an image with sufficient resolution to emulate a page in the sample book, but the color of the image is incorrect, the displayed image is useless for its intended purpose.

Errors in the displayed image color have several potential causes. Either the monitor or the scanner may be incorrectly calibrated. Leaving those causes aside, color imperfections may be caused by the inherent limitations of either the scanner or the monitor. According to color theory, it should be possible to reproduce any color by measuring intensity of light representative of the color at three discrete wavelengths. The light of these three wavelengths, adjusted to the measured intensities and mixed, will then duplicate the measured color.

However, the reproduction of a color rarely exactly follows theory. First, no measurement device is able to exactly measure light at a number of precise wavelengths. Errors in light measurement lead to errors in color reproduction. Second, the light sources used for color reproduction (in this case, phosphors in the monitor's screen) rarely precisely match the measured wavelengths. This introduces additional color errors into the reproduction process. Third, surface characteristics such as shine or texture often influence the apparent color of an object. These factors do not affect spectrophotometric measurements in the same way that they affect human color perception. Consequently, measured color and reproduced color may differ from perceived color.

A good way to overcome the above problems is to make a side-by-side comparison between the color image reproduced on the monitor and the actual decorative material from which the color bit map data was produced. It is possible to then manipulate the color data so that the image more closely matches the actual decorative material. During the process of assembling the color image data used in the present invention, each image is compared with the original material and manipulated, if necessary, to create optimized color image data.

Color image data that closely or exactly reproduces the image of a decorative material sample is not, in itself, sufficient to effectively replace sample books. As mentioned, sample books are expensive to produce and to obtain and are bulky and difficult to store. A sample book may contain 100–200 samples and, in the case of wallpapers, for example, a given distributor may handle 15,000 or more different patterns. Therefore, it is necessary to find some data storage medium to hold a large number of color images; a medium that is small and inexpensive compared to sample books. An ideal medium is the Compact Disc (CD) Read Only Memory (ROM). These small discs are relatively immune to damage and can be inexpensively replicated by a mechanical stamping process somewhat similar to the process that was used to reproduce vinyl sound recording discs.

However, the large size of color bit map image files is too great even for the prodigious capacity of the CD-ROM. If full-sized image files are stored on CD-ROM, a given wallpaper distributor's line of products might require some 20 CD-ROMs or more. While this represents a considerable improvement over sample books, it does produce a rather complex logistical situation if the products of several different distributors are to be studied by the consumer or the designer. There are mechanical disc changers available which provide automatic access to 16 CD-ROMs. However, if several disc changers are always needed, one starts to approach the cost and bulk of actual sample books. Therefore, the present invention also employs a judicious use of data compression techniques to greatly reduce the size of the image files. Compression methods such as the JPEG (Joint Photographic Expert Group) standard, which employs a high-frequency truncation of a cosine transform, are used. This and related methods are well known in the art of digital imaging. Another preferred technique is a Eractal compression method. Currently this method operates too slowly for the present invention. As soon as hardware improvements increase the speed of fractal compression, that method will probably replace the JPEG method. To be useful in the present invention compression techniques should be able to attains compressions between about 10 and 20 fold or greater.

When image data files are compressed, initial compression of, say, a few percent, does not normally result in a significant loss of image quality. However, as the degree of compression becomes more significant, the quality of the image may be compromised. Depending on the amount of fine detail in the original material, serious artifacts develop at different degrees of compression. Therefore, the present invention employs different levels of image compression with different images using the largest amount of compression that results in an acceptable final image. In addition, various sharpening techniques well known in the art of digital imaging are used on a case-by-case basis to produce an acceptable image with the highest possible degree of compression. This is analogous to the color optimization step. Again, side-by-side comparisons are use to produce optimally sharp compressed image files.

The net result of the above-described process is to produce a series of image files on a CD-ROM (or other suitable storage medium). These files produce accurate detailed color images of sufficient quality to be used like a sample book. Furthermore, all of a distributor's line of wallpaper (often some 15,000 patterns) can be placed on a single disc. However, while such a collection of image files can replace bulky and cumbersome sample books, it may be virtually impossible to use. With a physical sample book one can at least flip the pages and get a quick idea of content. It is much more difficult to riffle through the contents of the CD-ROM. An efficient means of using the image files is required.

A rather large number of different factors are involved in the choice of decorative materials. Certainly, in the case of wallcovering, cost, overall style, availability of coordinating fabrics, base material, and similar information can be very significant in making a selection. Similar, yet somewhat different, factors are important in selecting upholstery fabrics, window treatments, or flooring materials. Of course, a predominant factor in any decorating choice is the exact color and pattern image of the material. The image files discussed above contain important color data, but the question is how can the user access this information?

While most characteristics, such as general style or general pattern, can be reduced to a few words such as "modern" for style and "large floral" for pattern, it is generally not possible to textually describe a color. "Light blue" probably has as many meanings as there are individuals that use the term. However, as mentioned above, measuring color at three discrete wavelengths can provide a universal standard for color descriptions. Therefore, accurate color measurements are taken of the decorative material so that the colors of the material can be referred to and searched by repeatable, defined terms. Although these measured color values could be referred to by their mathematical value, that would not help the ordinary user. It is therefore better to reference the measured values to a recognized color reference system.

Color reference systems are used in color printing and other businesses where the specification and description of colors is of vital importance. These systems typically comprise an arrangement of colored swatches in a fan deck or a book logically arranged into color families according to hue and saturation. If a sufficient number of swatches are included in the reference system, virtually any color can be matched. Then any person with access to a copy of the reference system can look up a given swatch number and see how the original color appeared. Although there are numerous reference systems commercially available, the Pantone Textile Color Guide is a good choice for use with the present invention. The Pantone system has 1701 different swatches in a set, thus allowing virtually any color to be matched.

Most decorative materials have a single background color combined with several different foreground colors to define the material's pattern. In the present invention, the background color and the four most prominent foreground colors are measured from actual samples of each decorative material, and the measurements are used to derive the Pantone colors closest to the actual colors of the decorative material. In theory, these measurements could be derived from the color bit map data, since the scanner produces its output by measuring the reflection of light from the decorative material at three different wavelengths.

In actual practice, however, normal color scanners do not make their measurements with sufficient accuracy and wavelength precision to give truly accurate measurements at three wavelengths. A scanner with sufficient accuracy would probably be prohibitively expensive and mechanically cumbersome as well. Therefore, an accurate reflectance spectrophotometer, such as one produced in Switzerland by Greytag (Model No. SPM-50 or SPM-55), is used to manually measure color spectra of four millimeter-diameter spots on the sample of the decorative material. Output data from the spectrophotometer is routed to a computer which displays the measured color as an XYZ color triangle. The computer memory also contains the XYZ values for all of the Pantone reference colors. A least mean square computation is performed to find the Pantone colors that have the closest XYZ values to the measured colors from the decorative material. Pantone colors are then assigned to the foreground and background portions based on the measured colors.

After the color measurements and Pantone assignment has been made, the following is available for each sample of decorative material: a compressed image file, Pantone reference colors for the material's background color and for the four most prominent foreground colors, and auxiliary information that may vary depending on the type of the decorative material. Table 1 shows the preferred categories of auxiliary information for wallcoverings, Table 2 for upholstery fabrics, Table 3 for window treatments, and Table 4 for flooring materials. Virtually any decorative material in which color and pattern are important attributes is amenable to the scanning and color determining process described above. Different types of decorative materials would probably have slightly different lists of auxiliary information.

Most of the entries in Tables 1–4 are self-explanatory. Both distributor and manufacturer are listed because in some cases a distributor will select only some of a manufacturer's patterns while another distributor selects other patterns of the same manufacturer. Thus, related patterns from on manufacturer may be found in separate sample books from different distributors. Conversely, a given pattern may be available simultaneously from several distributors. Also, some manufacturers act as distributors. These relationships can be deduced from the Manufacturer and Distributor entries.

TABLE 1

WALLCOVERING INFORMATION

Distributor
Book Name
Page Number
Border Indicator
Square Footage
Pattern Match
Coordinating Papers
Color Ways
Pattern
Comments
Manufacturer
Pattern Number
Cost
Pattern Repeat
Material
Coordinating Fabric and Cost
Coordinating Borders
Style
Room

TABLE 2

FABRIC INFORMATION

Distributor
Book Name
Cost
Width
Pattern Match
Color Ways
Pattern
Manufacturer
Pattern Number/Name
Pattern Repeat
Material/Construction
Coordinating Fabric and Cost
Style
Comments

TABLE 3

WINDOW INFORMATION

Distributor
Pattern Number/Name
Material
Pattern
Style
Manufacturer
Cost
Color Ways
Room
Type

TABLE 4

FLOORING INFORMATION

Distributor
Pattern Number/Name
Material/Construction
Background Color
Type
Specifications
Manufacturer
Cost
Color Ways
Style
Size The "Style" entry and the "Pattern" entries are designed to provide brief textual descriptions of the decorative material to aid in selection and categorization. For example, wallcoverings can be divided into three style categories: "traditional," "contemporary," and "transitional." In addition, the pattern can be further broken down descriptively into the categories and subcategories shown in Table 5. Of course, most of this auxiliary information is not fully objective like the color description and the image files. That is to say, many other equally useful descriptive terms could be used as long as they aid the user to winnow down the number of possible choices.

TABLE 5

DETAILED PATTERN DESCRIPTION FOR WALLCOVERINGS

| PATTERN | SUBPATTERN |
|---|---|
| Abstract | |
| Animals/Birds/Fish | |
| Architectural | |
| Bows/Ribbon's | |
| Braids/Rope/Tassels | |
| Brush Strokes/Splatter | |
| Children's | Alphabet/Numbers |
| | Animals/Birds/Fish |
| | Balloons |
| | Bows and Ribbons |
| | Cartoon Characters |
| | Cowboys/Indians |
| | Circus/Carnival |
| | Florals |
| | Misc/Other |
| | Plaids/Stripes/Checks |
| | Polka Dot/Hearts/Geometrics |
| | Rainbows/Clouds/Sun/Stars |
| | Sports |
| | Storybook Themes |
| | Teddy Bears |
| | Toys |
| | Trains/Cars/Planes |
| Cultural Prints | |
| Damask/Jacquard | |
| Directional | |
| Faux Finishes | |
| Flame Stitch | |
| Floral-Miniature | All Over Pattern |
| | Baskets/Bouquets |
| | Birds and Florals |
| | Ribbons and Florals |
| | Stylized |
| | Trailing |
| | Other |
| Floral-Small | All Over Pattern |
| | Baskets/Bouquets |
| | Birds and Florals |
| | Ribbons and Florals |
| | Stylized |
| | Trailing |
| | Other |
| Floral-Large | All Over Pattern |
| | Baskets/Bouquets |
| | Birds and Florals |
| | Ribbons and Florals |
| | Stylized |
| | Trailing |
| | Other |
| Floral-Stripes | Large |
| | Small |
| | Miniature |
| Foliage | |
| Geometrics | |
| Historical Prints | |
| Imitation Finishes | |
| Lace | |
| Lattice | |
| Moire | |
| Motif-Large | |
| Motif-Small | |
| Murals | |
| Oriental | |
| Paisley | |
| Plaids | |
| Scroll Work | |
| Shells | |
| Silks | |
| Southwest | |
| Special Effects | |
| Sports | |
| Stencils | |
| Stone/Stucco/Stipple | |
| String-Solid Colors | |
| Stripes | |
| Suede | |
| Swags | |
| Textured | |
| Themes | Books |
| | Coats of Arms |
| | Hearts |
| | Houses/Buildings |
| | Landscapes |
| | Misc/Other |
| | Nautical |
| | Newsprint/Recipes/Text |
| | Sun/Stars/Clouds |
| Vegetables/Fruit | |
| Woods | |
| Woven | |

For each image file, the color information and the auxiliary information, including style and pattern descriptions, are combined into a compact database storage format and placed on the CD-ROM along with the image files. See FIG. 2 for a flow chart summary of the entire process. In actual practice the database is stored and used on the hard disc of the computer system. When a new CD-ROM is added to the system, the database information on the CD-ROM is appended onto a working database on the hard disc. The hard disc database covering all available wallpaper patterns (over 100,000 patterns) is less than 100 megabytes in size.

TABLE 6

COMPANY TABLE

Book
Distributor
Manufacturer
Roll Area

TABLE 6-continued

COMPANY TABLE

Trim
Directory *
Comments

TABLE 7

BOOK TABLE

Directory *
Page
Pattern Number

TABLE 8

PAPER COLOR TABLE

Pattern Number *
Pantone Page
Pantone Index

TABLE 9

PAPER TABLE

Pattern Number *
Pattern Repeat
Material
Cost Code
Style
Pattern Type
Subpattern Type
Room
Match
Border Page
Matching Fabric
Matching Fabric Cost
Background Color Pantone Page
Background Color Pantone Index
Image Resolution
Comments

TABLE 10

COORDINATED PAPER

Pattern Number *
Coordinated Pattern Number

TABLE 11

PANTONE COLOR TABLE

Color ID
Color Name
Pantone Page
Pantone Index
R
G
B

The database of the present invention comprises a relational database made up of multiple separate tables of information. A Database Engine, discussed below, is able to relate the tables together to make complex searches. Table 6 shows a Company table for the database. Table 7 shows a Book table. Table 8 shows a Paper Color table. Table 9 shows a master Paper table for wallpaper. Table 10 shows a Coordinated Paper table of coordinated papers. Table 11 shows a Pantone table of Pantone colors. The asterisked item in each table indicates an item for which the Database Engine constructs a key to facilitate relational joining of tables.

Although only the tables for wallpaper are demonstrated, all other decorative materials have similar homologous tables. The system is built around two basic factors: (1) the reference colors (Pantone colors), and (2) the Directory which represents the CD-ROM directory in which the color image file is stored. Most of the tables can be interrelated by way of the sample books. Table 6 shows that each sample book has its own Directory which is the actual physical location of the book's image data files on the CD-ROM. A Distributor and Manufacturer are listed for each Book as well as Roll Area and Trim information for the materials in the book. A Comment entry allows space for other information.

Table 6 can be related to Table 7 through the Directory key. In Table 7 a sample book Page number is given for each Pattern Number. The Pattern Number is, then, the major organizing principle for the individual wallpaper samples; even the file names of the color image data in the Directory can be derived from the Pattern Number. Table 9 gives the structure of the Wallpaper information table. This table is keyed on Pattern Number so it can be easily related to Paper Color (Table 8) and Coordinated Paper (Table 10). The Paper table contains all the information about each Pattern Number including Pattern and Sub pattern types (see Table 5). In addition, a Background Color is specified in the Pantone Textile Color Guide as a Page Number in the guide and an Index position (i.e., one through seven) on the page.

The foreground colors for each Pattern Number are given in Table 8 as a function of Pantone Page and Pantone Index. A Pantone Color Table (Table 11) allows the system to construct and display Pantone Colors for search purposes (explained below). In addition, any wallpaper with a given Pantone color can be located by searching the Paper Color table by Pantone Page and Pantone Index. Table 11 gives a Color ID Number and Color Name as well as the Pantone Page and Pantone Index for each color. So that the colors can be properly displayed, the RGB (Red, Green, Blue) values for each color are stored in the table. Each time a Pantone color is displayed, the system fetches this value for the particular color and displays the color.

Figure 2:
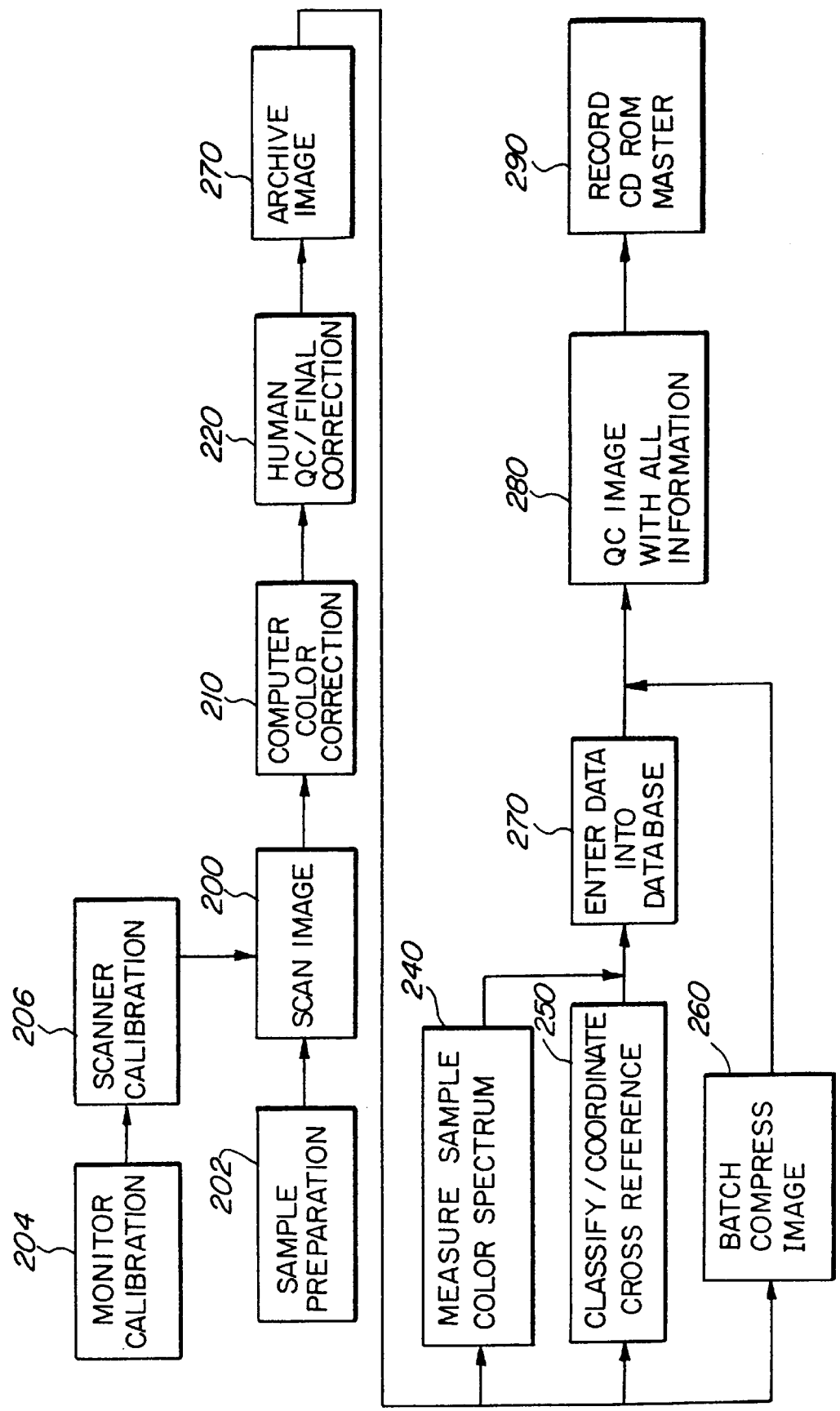
FIG. 2 shows steps of preparation of data compilations of the present invention.

FIG. 2 summarizes the steps of sample data production. To review: the color image data is generated by scanning a sample usually with a scanner (Scan Image step 200). Before the scan image step 200 can occur, there must be a Monitor Calibration step (204) and a Scanner Calibration step (206). It is also necessary to prepare the sample by selecting an undamaged portion of the sample that contains a complete pattern repeat (Sample Preparation 202). After the color image data is produced by the Scan Image step (200), the image is corrected electronically (Computer Color Correction 210) and checked by side-by-side comparison and manually corrected if needed (Human QC 220). An archive copy of the data is made and stored for future use (Archive Image 230). Areas of the sample are then measured with a spectrophotometer (Measure Sample Color Spectrum 240) to create color descriptive data (i.e., reference system equivalents of sample colors). At the same time, all the auxiliary information about the sample is collected and cross-referenced (Classify/Coordinate Cross Reference 250). The image files are then compressed and corrected as necessary (Batch Compress 260). The data about the sample is then entered into the database (Enter Data 270). Finally, the database data and the image data are integrated and the results are checked to be certain that the correct pattern data is combined with the correct database data (QC Image 280). Finally, the combined pattern and database data are written onto a master CD-ROM (Record CD ROM 290). The master ROM is then sent to a manufacturing plant where inexpensive copies are made.

Now that the process of preparing and assembling the data has been described, it is possible to detail how the present invention uses the assembled data to replace cumbersome and expensive sample books. An object of the present invention is to replace old-fashioned sample books in a way that not only saves money and storage space, but is also more effective and efficient than the traditional method. Database software is used to search through the mass of data and select items that match certain predetermined criteria.

In the case of the wallcovering data discussed above, the consumer might ask for wallpaper with a large floral pattern of red (Pantone color) on a white background (Pantone color). These colors would have been selected by viewing the Pantone fan deck or by using the deck to match the color of some furniture intended to occupy the room being decorated. Database software can be extremely powerful. Use of relational database software makes all possible interrelationships of various types of information easy to explore. However, the database is only as useful as the quality of the questions (queries) put to it. If the exactly correct query syntax and format is not followed, the results of the database search may be useless.

Most consumers and interior designer are not computer literate and might have problems operating a more traditional computer system. Therefore, the present invention employs a Graphical User Interface (GUI) where items can be selected and activated by simply pointing at graphical representations on the display screen. Pointing is carried out with a mouse, touch screen or other input device. The present invention uses the GUI interface to make it relatively easy for the user to construct consistent and reliable queries for embedded database software without any knowledge of databases.

The system comprises a number of software modules which are coordinated and overlaid by a GUI Management module. The GUI module is responsible for all interaction with the user and interaction between computer devices (i.e., hard disc drives and CD-ROM drives) and software modules. Many of these functions are carried out by operating system software. The embodiment demonstrated below uses a Windows/DOS operating system, but the system could be implemented by any GUI operating system such as the MACINTOSH operating system. The software modules have been written in either high-level languages like C or Visual Basic or directly in assembler depending on the execution speed required of the module.

Figure 3:
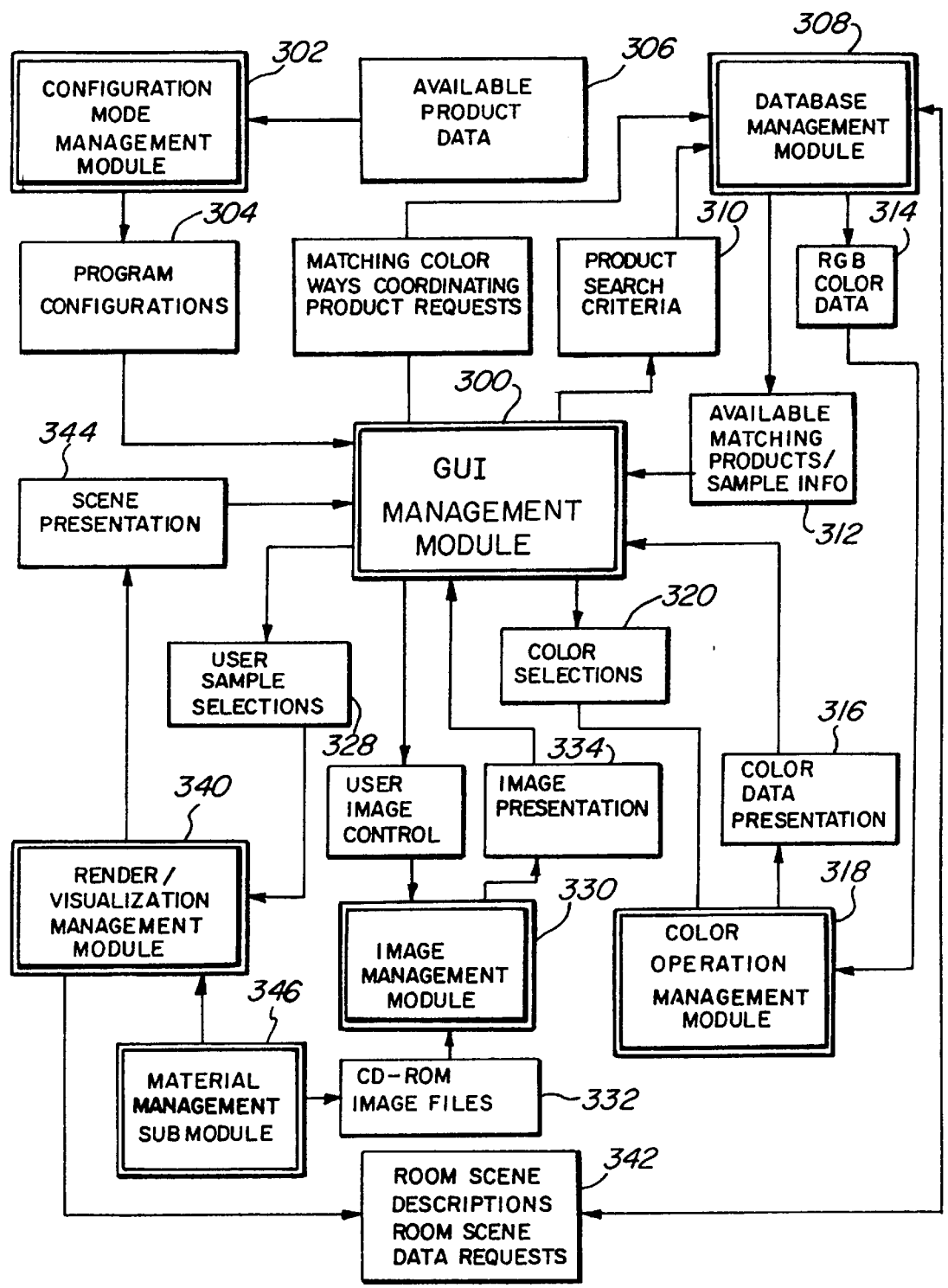
FIG. 3 is a diagrammatic flow chart of interrelations of modules of the program of the present invention.

FIG. 3 shows the major functional grouping of the software modules (most 3submodules not illustrated) and the data paths between them. A GUI Management module (300) is central and mediates between most of the other modules. It also is linked to the computer system's hardware through the operating system (linkage not shown). GUI Management 300 comprises several interrelated submodules: User I/O Management, Visual Tools Management, Video Management, Help Management and Sound Management.

User I/O Management controls the user input devices such as the keyboard and the mouse. This system ensures that the keyboard is operational only when its input is proper. The system also ensures that the position of the mouse-driven cursor and any mouse clicks are passed to the appropriate software module.

Visual Tools Management and Video Management work together to present the correct visual interface to the user. Responding to information from other modules the Video Management creates arid displays the appropriate screen. Visual tools such as a mouse cursor are displayed and moved by the Visual Tools Management module.

Help Management and Sound Management work together to provide a contextual help system for the user. That is, the particular help message printed on the screen (or spoken by means of the Sound Management) are responsive to the particular screen or task in which the user is involved.

Because the system is intended to replace sample books with a rapid search of the CD-ROM images, it is important that the system always be aware of which ROMs are available (i.e., which distributor's lines are available) and, since the type of auxiliary information differs for different types of decorative materials, what types of decorative materials are represented by the available CD-ROMs. Also, it is possible that different installations of the system will be designated to work with particular type material; i.e., a given site might be designated as a wallcovering-only site and the system will, therefore, refuse to utilize CD-ROMs containing fabric or other nonwallcovering data. All these functions are carried out by the Configuration Mode Management. The Configuration Mode Management module (302) is comprised of several interrelated submodules: Product Type Management, Program Capabilities Management, Product Attributes Management, and Product Availability Management.

Product Type Management configures the operation of the system for a particular product type (i.e., wall-coverings) selected by the user. This submodule works with Program Capabilities Management which dictates which product types are available for the user to choose (Program Configurations 304). As mentioned above, different products have different types of auxiliary information (attributes), and the appropriate attributes (Available Product Data 300) are sent by a Product Attributes Management submodule to the GUI Management module to appear in user screens. Product Availability keeps track of which distributor line (i.e., which CD-ROMs) have been installed in the system. This submodule automatically switches in the correct ROM if a ROM changer or multiple ROM drives are available. Otherwise the Product Availability Management module causes a screen message to display requesting that the user physically insert the correct CD-ROM.

The searching aspects of the system are handled by a Database Management Module 308. This module interfaces between the rest of the system and the database of pattern, style, color, and auxiliary attributes. The Database Management Module 308 contains a number of submodules: the Database Engine, Query Generation Management, and Database Record Retrieval and Formulating. The actual searches are performed by a Database Engine. This software submodule is available, off-the-shelf, from Quad Base Systems, Sunnyvale, Calif. The Database Engine manages a fully relational database in a multi-tasking mode and responds to SQL (Structured Query Language), a standard database language. A Query Generation Management module takes the user's responses from the various user screens (described below) and transforms the information into an appropriate SQL query (Product Search Criteria 310). The SQL query is passed to a Query Execution Management submodule that runs the query on the database engine and properly traps and responds to any error or other messages from the Engine. After search results are produced, a Database Record Retrieval and Formulating module retrieves, decodes and formats the correct record(s) (Available Matching Products 312) so that the GUI Management module can properly display the results.

A powerful feature of the present invention is that it enables the user to search for decorative materials on the basis of Pantone color, as well as style, patterns, and other auxiliary attributes. That is, a database containing hundreds of thousands of decorative materials can be rapidly searched for any of the above items, separately or in combination. Most of the search items are relatively straightforward, and some are known in the prior art. However, prior art methods have not even attempted to ensure accurate color display and do not allow searching on the basis of spectrophotoinetric measurements and color reference systems.

A Color Operation Management module 318 controls much of the specialized color ability of the present invention. This module also contains several submodules: Palette Database Retrieval, Color Correlated Search, Matching Paint Management, Physical Color Measurement Input, and Color Print Management. When the user wishes to search on the basis of color, a color palette of Pantone colors is presented so that a preferred color or color range can be chosen. To display the Pantone palette a Palette Database Retrieval submodule queries the database for RGB values (Color Data 314) of a portion of the Pantone palette to be displayed (Color Data Presentation 316) through the GUI Management module 300. A Color Correlated Search module takes the color(s) (Color Selection 320) selected by the user and formulates an appropriate database query from them based on the Pantone reference numbers. The Search module also implements "relaxed" color searches, which allow the user to search automatically for all or part of the Pantone pages surrounding a given selected color.

The Color Operation Management module 318 also controls several specialized color functions. A Matching Paint Management module searches the database for "corresponding" paints that match or fall close to the selected color. The paint search may readily be limited to certain paint manufacturers. Although the search for paint color is preferably carried out by using the selected Pantone color (that is, matching paints have a Pantone color very close to the selected Pantone color), the database contains actual measured XYZ color values for paints. When paint chips are displayed, the RGB colors calculated from measured XYZ values are displayed so that the user can appreciate any slight deviation of the paint from the Pantone reference colors. A Physical Color Measurement Input submodule allows a color search to be conducted from an actual measurement, with a portable calorimeter, of some article that the user wishes to match (i.e., Grandma's brocaded chair). Finally, a Color Print Management submodule makes necessary conversions from the monitor's RGB color space into an appropriate color space of a color printer to produce accurate color prints of the monitor display on the color printer.

After a search based on color, pattern, style, or auxiliary attributes, the located decorative materials must be displayed as an accurate color image on the monitor to allow side-by-side comparison of materials, thereby facilitating a choice of a preferred material. Such displaying is controlled by an Image Management module 330. As explained above, the database used for the search is physically located on the hard disc of the computer. Each sample record in the database points to the actual Image File 332 of the decorative material. The image files are located in a compressed format on the CD-ROM. A Database Image Management submodule obtains the requested image files (User Image Control 328) from the CD-ROM. The files are read from the ROM and rapidly decompressed by a Rapid Image Display submodule, which is a special high-speed decompression program provided by a third-party vendor, Xing Technology, Arroyo Grande, Calif. A Variable Resolution Management submodule takes into account whatever resolution was used to produce the chosen image file and scales it appropriately for display (image presentation) on the computer monitor.

Once the search process has produced a number of possible choices of decorative materials, the system can provide an image of a typical room on which the computer can "paint" or "render" the decorative materials. This function is provided by a Render/V-isualization Management module 340. This module contains a Render Scene Management submodule (Room Scene Descriptions 342), which allows the user to search through over 200 room scenes to select a room most like the room to be decorated. Each room image has been prepared for rendering, in advance, by constructing a "wire frame" model that indicates the orientation of each surface in the room image for correct rendering of the decorative materials. Alternatively, the user can operate a Scene Object Generation submodule, which allows total control of the wire frame model. Wall and windows and other aspects of room organization can be quickly reoriented as the user desires. The model room can be rotated so it can be viewed from all possible angles.

The selected decorative material images from the CD-ROM are scaled and converted into a special format by a Render Material Management submodule 346, which passes the converted patterns to a Rendering Engine submodule provided by a third-party vendor, Micro System Options, Seattle, Wash. The Rendering Engine takes the selected decorative materials (wallcovering, floor covering, upholstery, and window treatments), renders them onto the selected room image, and sends the results (Scene Presentation 344) to the GTJI Management module 300. The end result is a room image that shows the selected materials installed with correct perspective and shading. It is possible to change the room lighting from daylight to evening to see how the room appears at different times of the day. The rendering process is, rapid (less than one minute), so it is possible to produce a large number of rooms, each one with a different combination of decorative materials.

EXAMPLE

Figure 4:
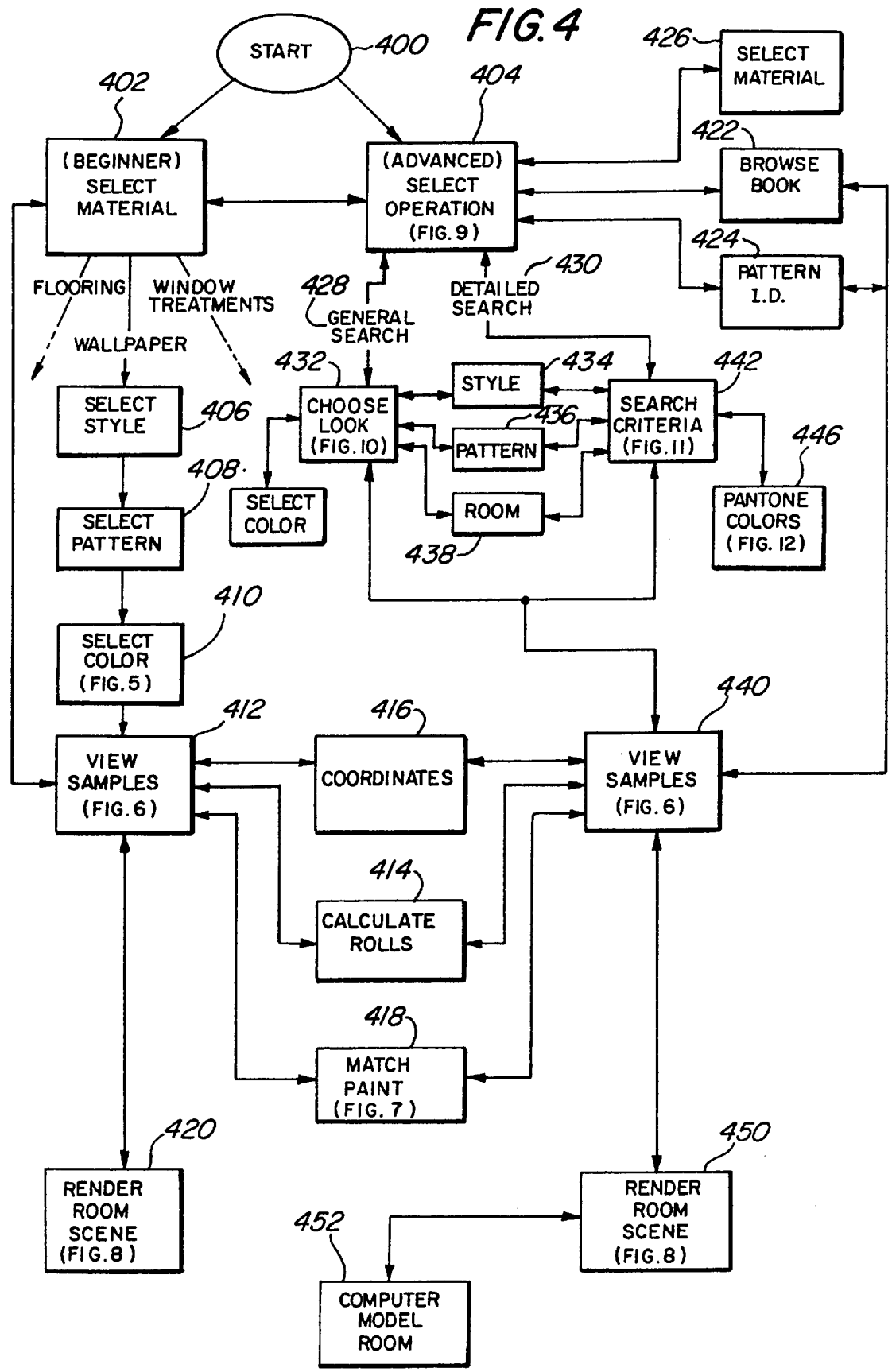
FIG. 4 is a diagrammatic flow chart illustrating sequential operations of the program of the present invention.

Now that the overall structure and functioning of the system has been explained, an actual example will be demonstrated step by step so that the present invention can be easily understood. FIG. 4 shows a flow chart of the system function that will help a reader to understand the operations of the system. After a Start Screen 400 in which the system's name and manufacturer is displayed, a "Beginner Search" screen 402 is displayed. This screen is intended for use by ordinary consumers, as opposed to interior designers, and, hence, does not offer as many options to the user. An "Advanced Search" screen 404, which offers more flexibility and options, is also available and will be described below. As mentioned above, a major purpose of many of the screens is to gather information for the automatic formulation of a query for searching the database for materials that fit the user's criteria. The first Beginner Search screen offers choices of three decorative materials types that the user can search: Wallpaper, Flooring, and Window Treatments.

Most of the system functions are common to all material types; however, wallpaper offers more options and, hence, will be used for the example. After wallpaper has been selected, the system asks for a Style choice 406. The available choices are Traditional, Contemporary or No Preference (both Traditional and Contemporary). Next the user is asked to select a pattern type 408. The possible pattern choices are shown in Table 5. The user may choose any one pattern type or No Preference to accept any pattern type.

Figure 5:
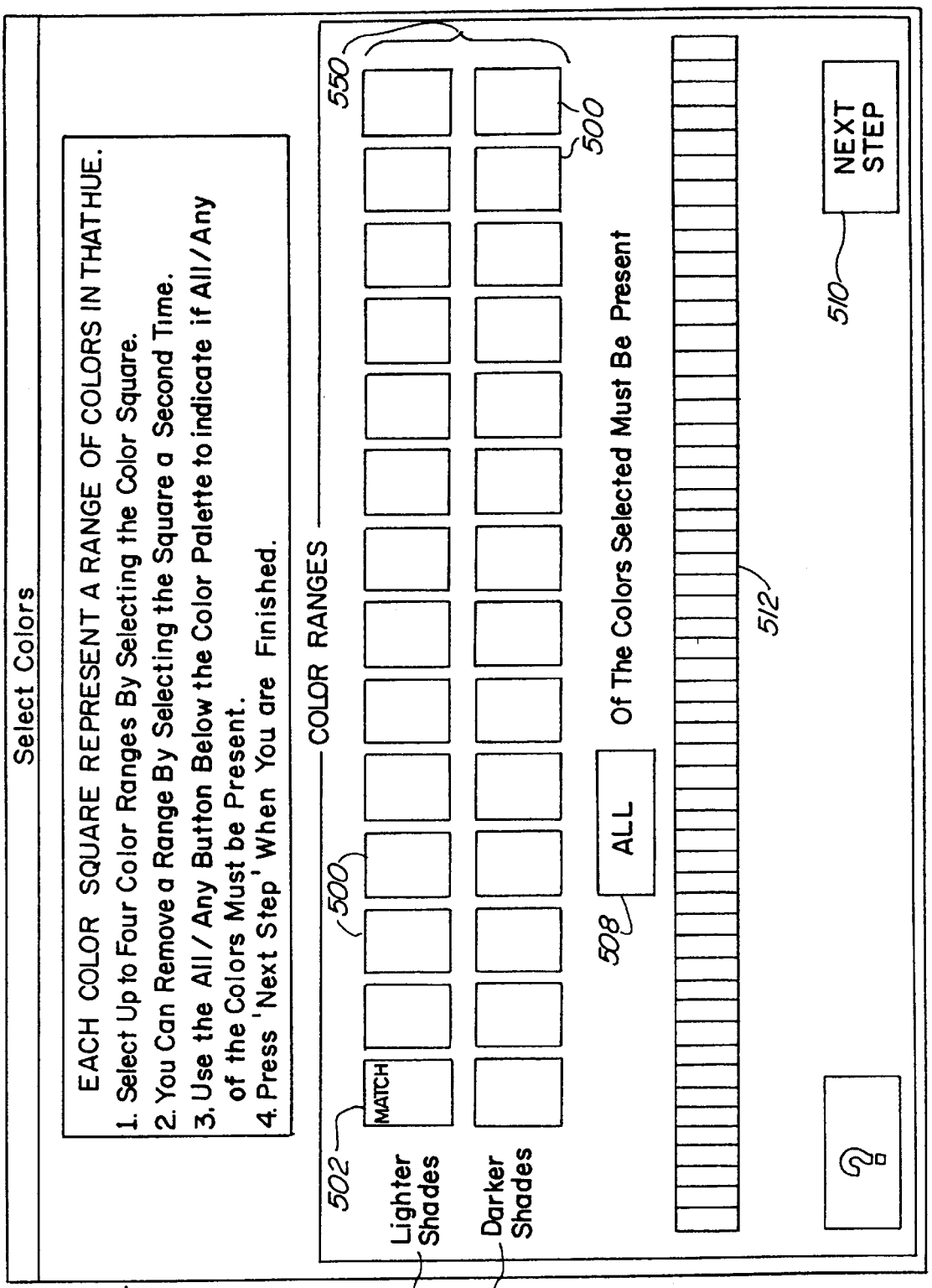
FIG. 5 is a diagram of a Beginner Search "Select Colors" screen that forms a part of the operations illustrated in FIG. 4.

After selecting a pattern, the user is presented with a "Select Colors" Screen 410. This screen (FIG. 5) allows the user to choose up to 4 foreground colors of a palette 550 of 28 color swatches organized as 14 lighter shades 504 and 14 darker shades 506. The 28 swatches 500 represent a condensed version of the 1701 Pantone colors. When a color 502 is selected, it is labeled "Match" and the complete range of colors represented by that swatch are displayed in a rectangle 512 below the swatches. An "Any/All" button 508 gives the user a choice of either "All," meaning that all of the colors selected must be present in the decorative material for it to be selected by the search, or "Any," meaning that a material will be selected if it contains any of the selected colors. Leaving the Select Colors Screen by means of the Next Step button 510 causes the Database Engine to execute the search query constructed from the user's choices.

If the search is successful, a "View Wallpaper Samples" screen 412 (see FIG. 6) is displayed. The left-hand portion of the screen displays a full color image 602 of the first wallpaper sample that fits the search criteria. This image may be enlarged by selecting a "Magnify" button 604 on the lower right part of the screen. The right-hand portion of the screen displays information about the sample extracted from the database. The pattern number 606, distributor 608, book name 610, page number in book 654, and retail price 656 of the item are given. In addition, the four Pantone foreground colors 612 are displayed with their Pantone designations 614, as well as the Pantone background color 616 and its designation 618.

The style 620, pattern type 622, and recommended room type 624 are also listed. A "More Info" button 626 gives access to another screen (not shown) that lists additional information about the sample, including square footage of a roll, pattern match and repeat, material type, border information, coordinate information, manufacturer, and optional comments. The View Wallpaper Samples screen 412 also shows how many samples (628) were found by the search and contains "Arrow" buttons 630 to move from one sample to the next. When the displayed sample 602 is particularly suitable, the user may "mark" it for later use by "clicking" on the sample with the mouse. Status 632 of the sample 602 indicates whether the sample has been marked for later use. A "Calculate Rolls" button 634 gives access to a calculation screen 414 (screen not illustrated) where the cost and number of rolls of wallpaper needed are rapidly calculated after the user inputs dimensions of a room that is to be wallpapered. A "Coordinate" button 636 shows a coordinated images screen 416 (screen not illustrated) of any coordinated wallpapers or borders that the manufacturer or distributor has designated. These may also be marked for later use.

Figure 7:
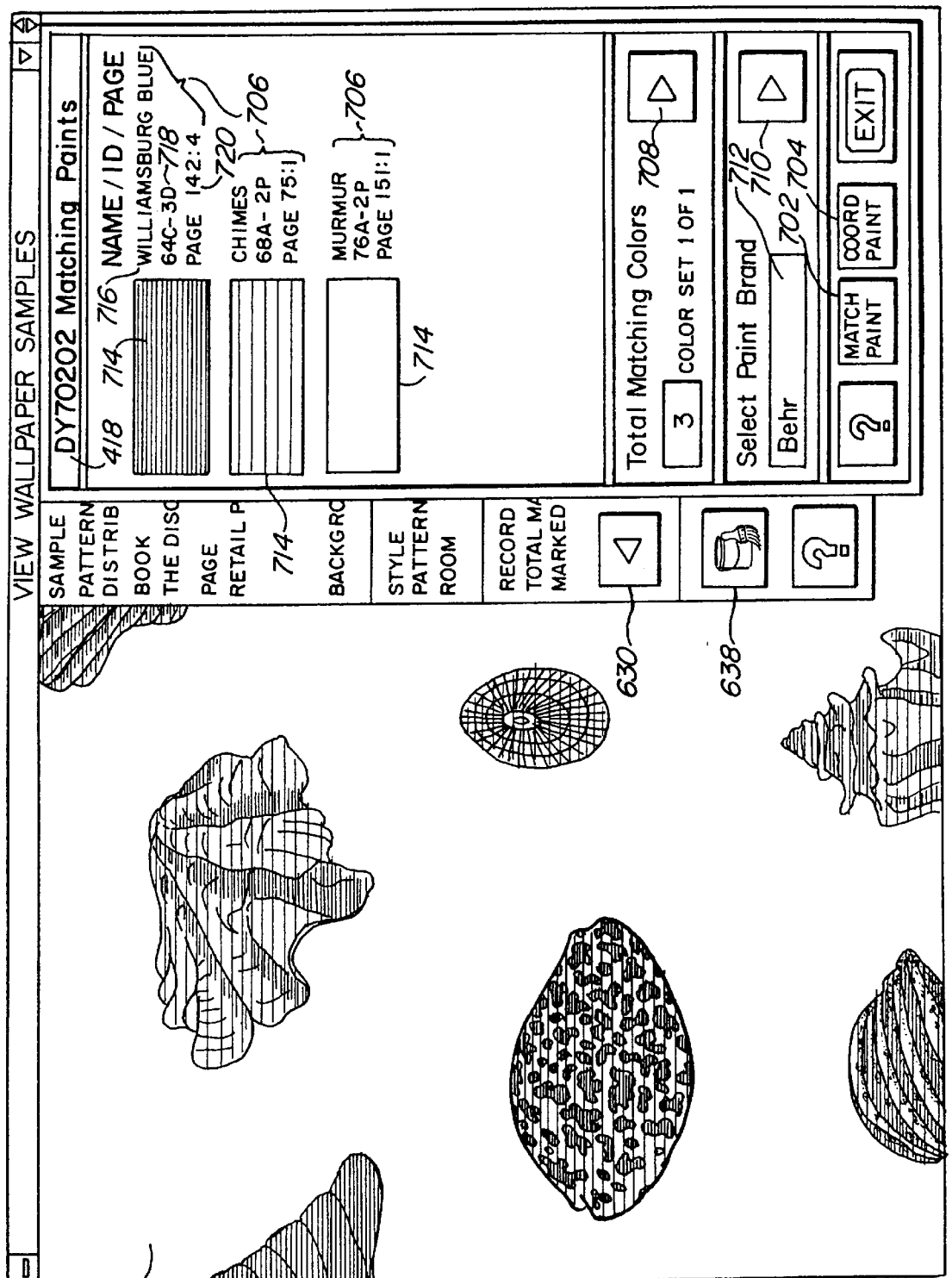
FIG. 7 is a diagram of a Beginner Search "View Wallpaper Sample" screen of FIG. 6 with an overlapping "Match Paint" screen.

A "Paint" button 638 calls up a paint matching window 418 (FIG. 7) where a "Match Paint" button 702 finds paints 706 that match the colors of any sample that has been marked for later use. An "Arrow" button 708 allows the user to cycle through the marked samples. Matching paints are displayed according to paint manufacturer 712 (Select Paint Brand button 710). The user is shown a color swatch 714 for each matching paint, along with the paint name 716, the manufacturer's number 718, and the page number 720 in the manufacturer's book. The paint swatches 714 that are displayed are produced from data derived from actual spectrophotoinetric measurement of actual paint chips. However, the match is made on the basis of the Pantone colors found in the marked sample. Just as the actual decorative material sample colors were associated with the closest Pantone color through a mean least squares fitting procedures, the individual paints are each associated with the closest Paintone color and paints whose Pantone color matches the Pantone colors of the sample are selected. The user is also able to select a "Coord Paint" button 704 rather than the "Match Paint" button 702. Coordinated paints are those paints that have hue (color) in common with the matched paints but have a different level of saturation (i.e., either lighter or darker). This alternative gives the user a wider range of possible paints from which to choose. Any of the displayed paints 714 can be "marked" for later use.

Figure 8:
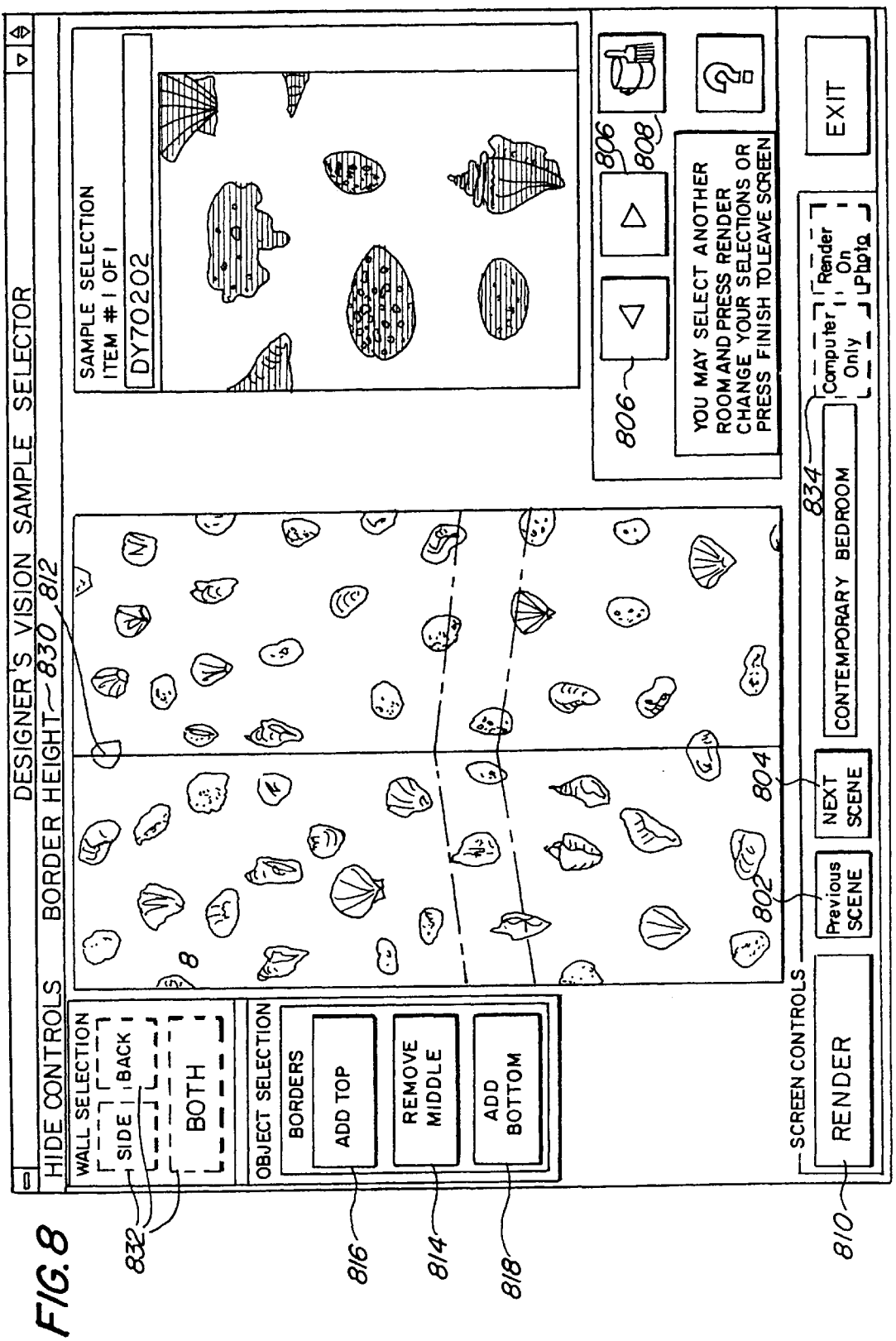
FIG. 8 is a diagram of a Beginner Search "Create Room" screen with additional features found only in the Advanced Search shown in dotted lines.

Finally, the user can also choose a "Room Settings" button 640. This takes the user to a "Render Room Scene" screen 420 (FIG. 8). The user is able to select a typical furnished room ("Previous Scene" 802 and "Next Scene" 804 buttons) from a portfolio of several hundred rooms. The user is expected to select a room scene similar in appearance to the room that is to be decorated with the marked decorative samples. The user then selects one ("Arrow" button 806) of the marked decorative samples and/or paints ("Paint" button 808) and indicates where they should be placed in the room (i.e., borders at the top or middle of the walls, and wallpaper or paint on primary wall surfaces) by clicking on that region. The system then renders ("Render" button 810) the paint or wallpaper onto the room image 812 so that the user can see how the selected material(s) might actually look in use. Buttons allow control of borders at the top 816, middle 814, and bottom 818 of walls in the imaged room scene 812.

Figure 6:
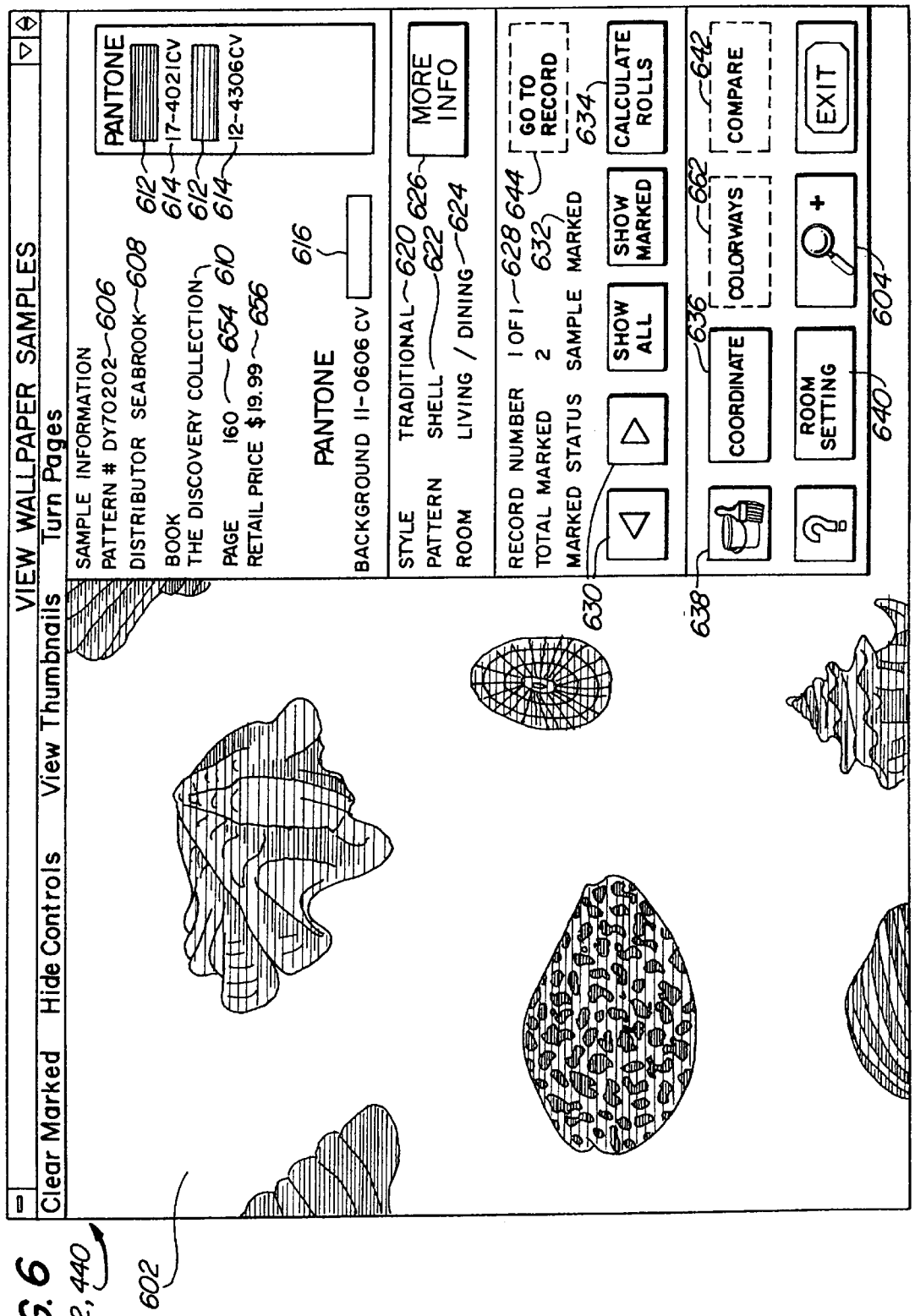
FIG. 6 is a diagram of a Beginner Search "View Wallpaper Sample" screen with additional features found only in the Advanced Search shown in dotted lines.
Figure 9:
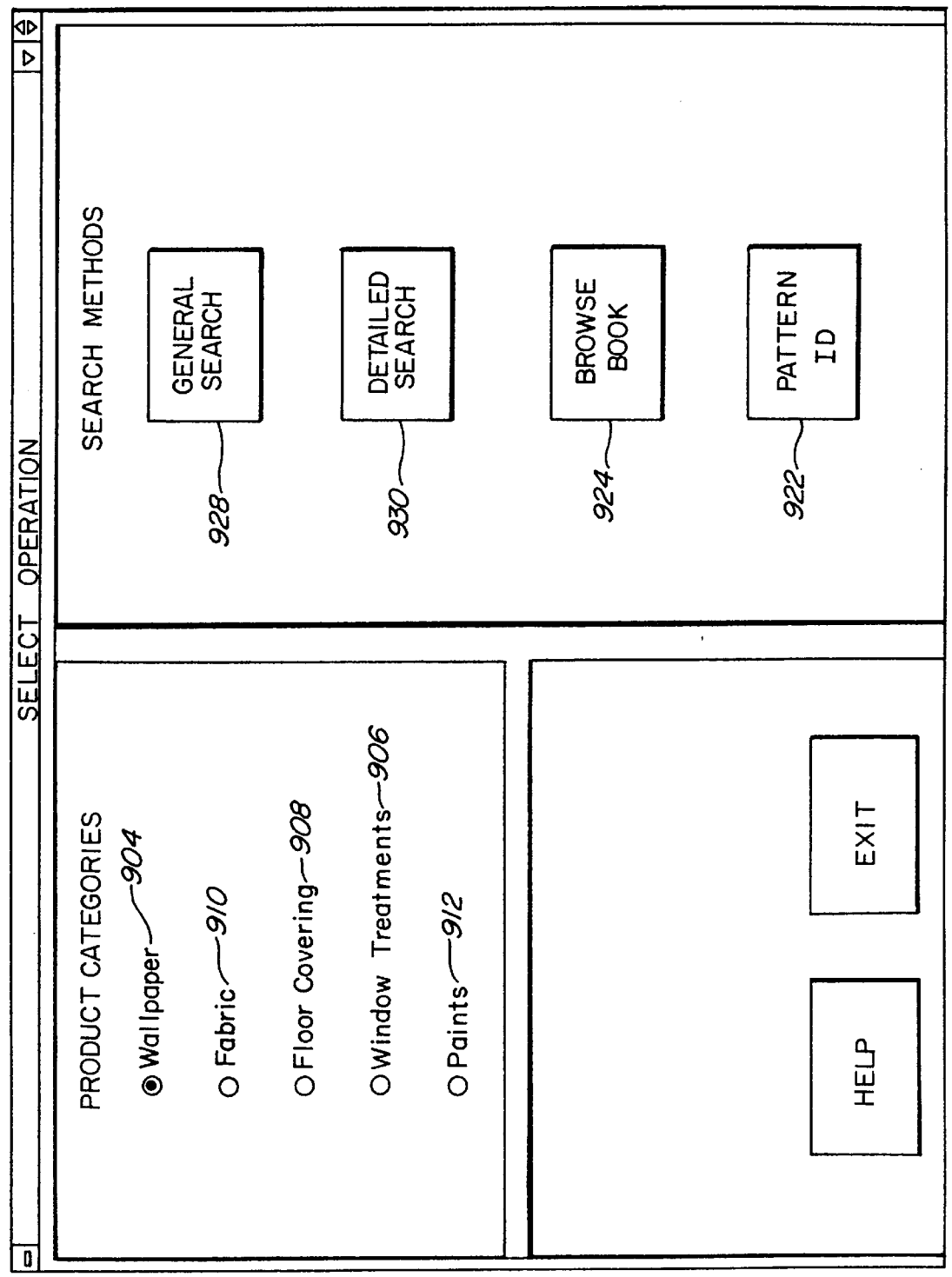
FIG. 9 is a diagram of an Advanced Search "Select Operations" screen that forms a part of the operations illustrated in FIG. 4.

Besides the Beginner Search 402 that has just been explained, the system also provides an Advanced Search 404 for use by interior decorators and other design experts. This search uses virtually the same tools as the Beginner Search 402, but allows a greater latitude of a choices and controls for the more sophisticated user. The Advanced Search 404 first allowed; the user to select decorative material type (Select Material 426) (Product Categories 902) for the search from wallpaper 904, window treatments 906, floor covering 908, fabrics 910, and paints 912. For this example, wallpaper will again be used. The user is shown a "Select Operations" screen 404 (FIG. 9) that displays, in addition to Product Categories 902, a choice of search types: General Search 428 (button 928), Detailed Search 430 (button 930), Browse Book 422 (button 922), and Pattern ID 424 (button 924). Browse Book 922 allows the user to "open" a sample book by selecting the book's title and to page through the book and view the decorative material on each page. For each sample viewed, controls similar to those discussed for FIG. 6 are available. There are also some new options available which will be discussed below. Pattern ID 924 allows the user to view (as in FIG. 6) any pattern by entering the manufacturer's pattern number.

Figure 10:
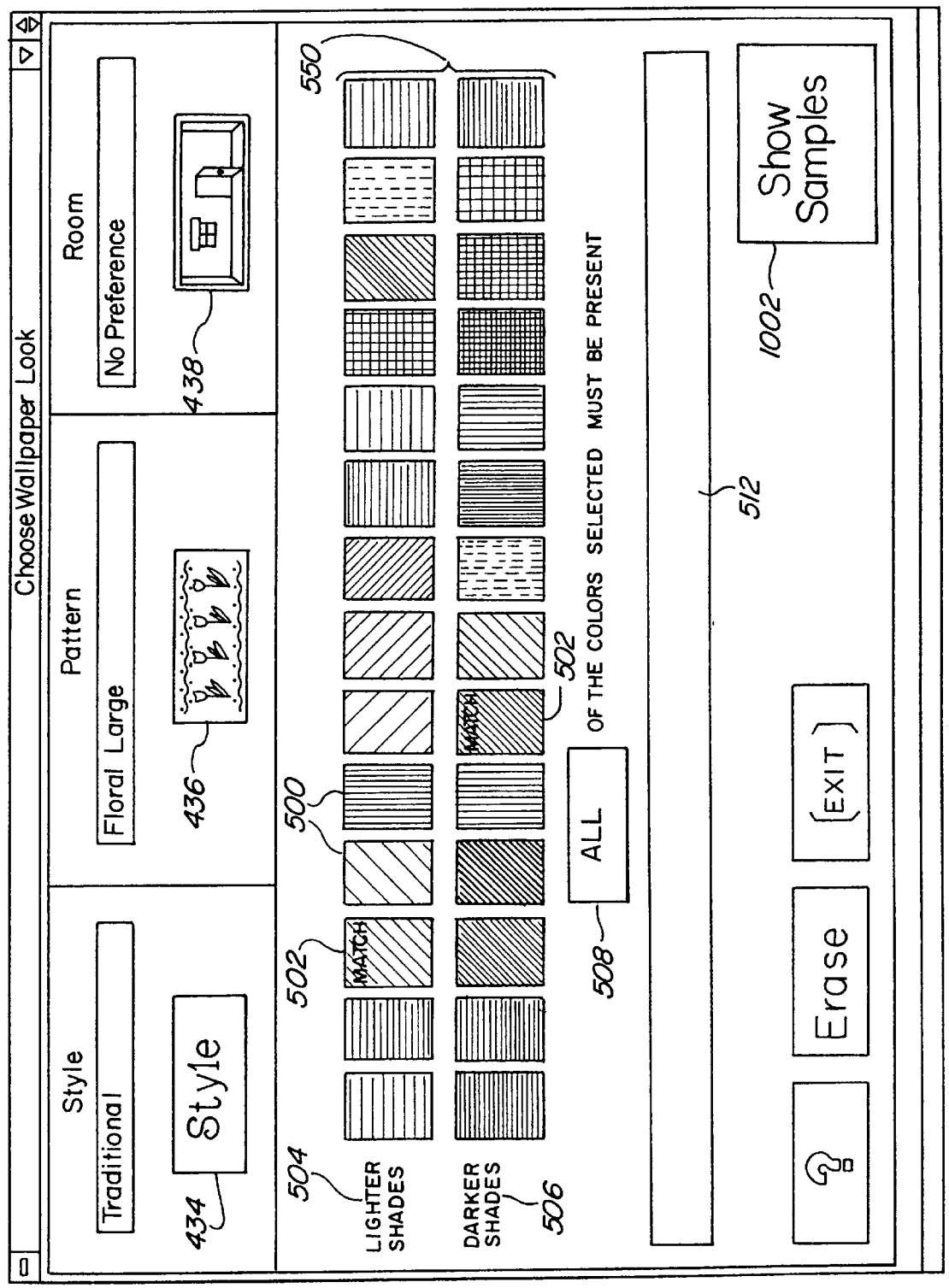
FIG. 10 is a diagram of a "Choose Wallpaper Look" screen from an Advanced General Search.

Selecting the General Search 928 reveals a master selection screen "Choose Wallpaper Look" 432 (FIG. 10) that combines several of the screens of the Beginner Search. The screen contains buttons that allow choice of "Style" 434 and "Pattern" 436 as in the Beginner Search. In addition, a preferred room type 438, such as "kitchen," is also selectable. The screen's color selection palette 550 with 28 possible choices is identical to the palette 550 in FIG. 5 of the Beginner Search. When all the selection criteria have been made, a "Show Samples" button 1002 causes the system to search for samples that fit the criteria. Any matching samples are displayed in a "View Samples" screen 440 very similar to FIG. 6 of the Beginner Search 402.

The Detailed Search button 430 causes an advanced "Search Criteria" screen 442 (FIG. 11) to be displayed. This screen allows selection of Style 434, Pattern 436, and Room 438 just like in the General Search 402. The user is also able to make a border selection 1108: wallpaper only 1110 (no borders), borders only 1112, or wallpaper and borders 1114. In addition, this screen allows the user to choose the sample book 1122 ("Arrow" button 1118) and the distributor of the wallpaper ("Distributor" button 1120), as well as a Cost setting 1124 (slider) for selecting a minimum or maximum cost limit for the wallpaper search.

Figure 12:
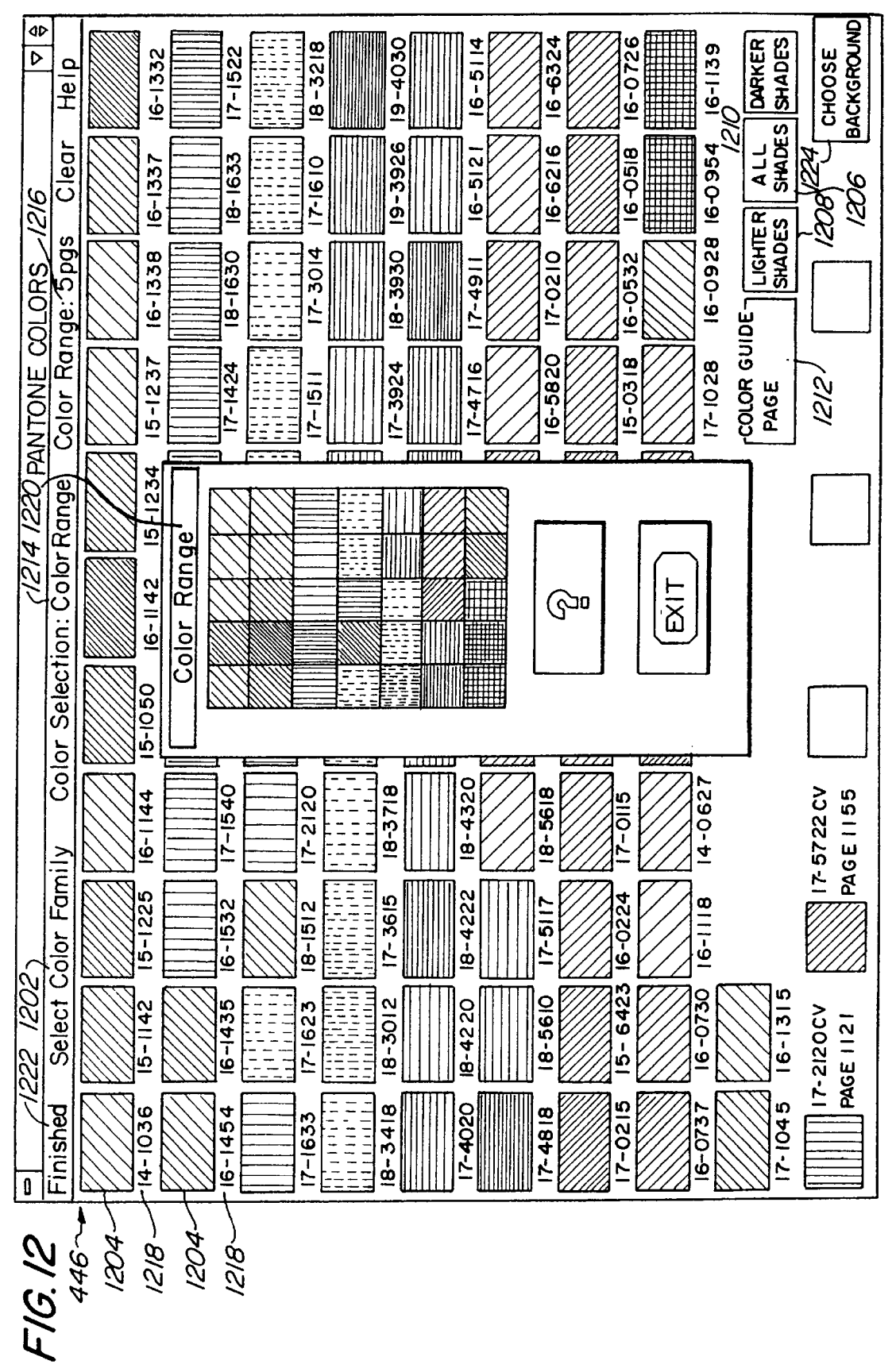

A palette for color selection is much more complex in the Advanced Search 404. When a "Colors" button 1126 is selected, a "Pantone Colors" screen 446 (FIG. 12), which duplicates the Pantone Textile Color Guide, is revealed. The Color Guide comprises 1701 different color swatches arranged on 243 pages in a fan deck with each page displaying seven color swatches arranged in order of increasing saturation. The Guide is divided into three separate color families: Clean and Bright Colors, Muted and Dull Colors, and Earth Tones. It is possible to choose, any of these families (menu 1202). The screen then displays a plurality of swatches 1204, one swatch, along with its Pantone number 1218, from each page of the Guide organized in order of ascending pages. Each color family can be displayed in "All Shades" mode 1206, where the displayed swatch is the middle swatch on each Pantone page; in "Lighter Shades" mode 1208, where the displayed swatch is the next to the lightest switch on the page; or in "Darker Shades" mode 1210, where the displayed swatch is the next to the darkest swatch. Moving the mouse cursor over the swatches causes the Pantone page number 1212 to display so that the user can easily look the color up in the Pantone deck.

Figure 11:
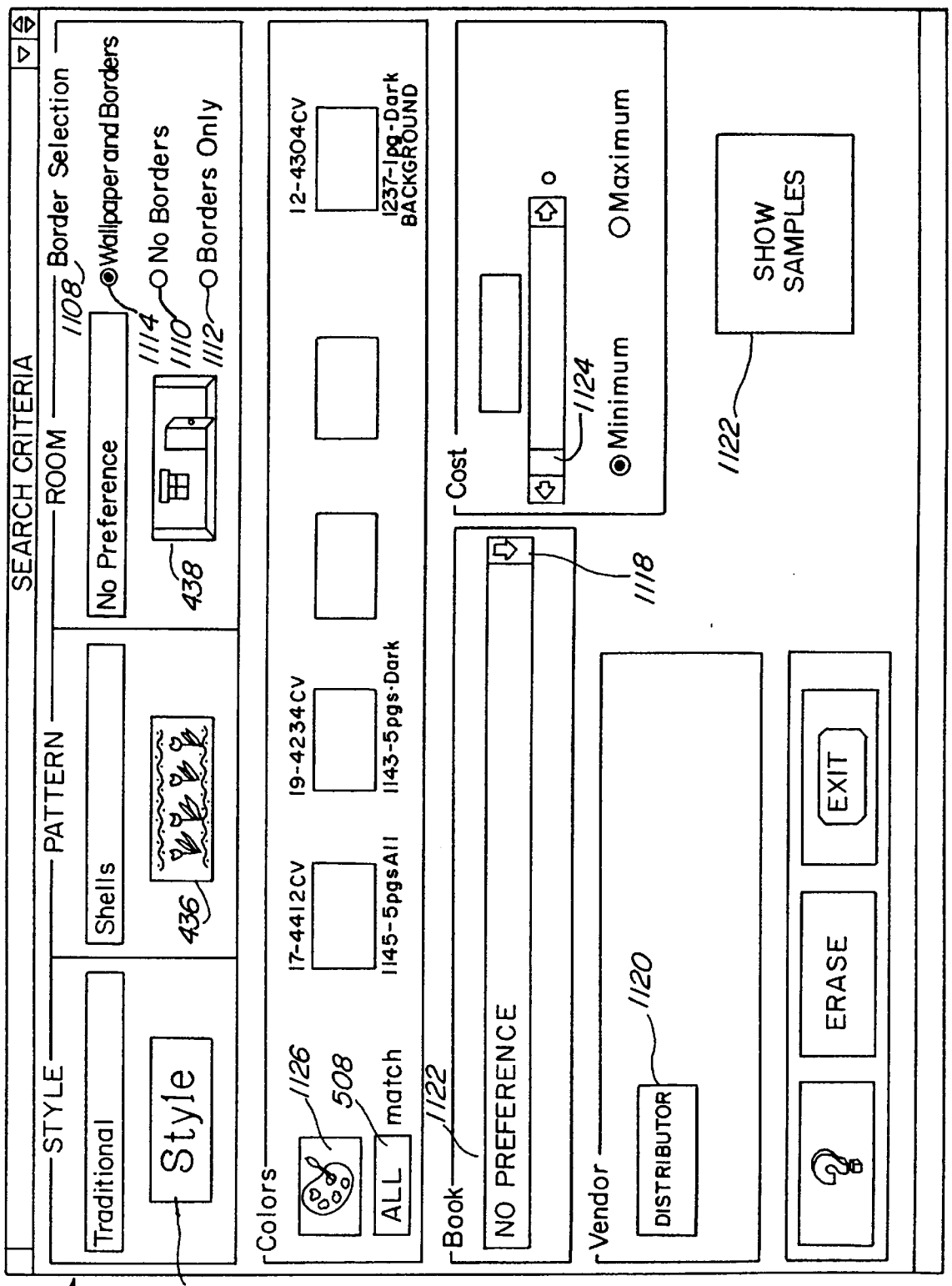
FIG. 11 is a diagram of a "Search Criteria" screen from an Advanced Detailed Search.

Selecting one of the color swatches causes the entire Pantone page to appear in a separate window (not shown) so that any of the seven colors on that page can be selected. A range of colors (menu 1214) may also be selected for a search. The range may include colors on one, three, or five pages (menu 1216) on either side of the displayed color. In the Lighter Shades mode, the range includes only the lightest two swatches of each page in the range. In the Darker Shades mode, only the darkest five swatches in each page are included in the range. The range for a particular color can be displayed in a separate "Color Range" window 1220 that appears over the Pantone Color Screen 446 so that the user can easily visualize the color range that will be searched). The user selects up to four foreground colors and one background color (button 1224) before returning (menu 1222) to the Search Criteria Screen 442 (FIG. 11).

Selecting the "Show Samples" button 1122 causes the search to be performed, and the first found sample displays on a View Wallpaper Sample screen 440 which is almost identical to the View Wallpaper Sample screen 412 of the Beginner Search 402 (see FIG. 6, the Advanced Search features are shown in dotted line). A "Color Ways" button 662 shows any color ways, that is, the same pattern in different colors, for the selected sample. There is also a "Compare" button 642 that allows the user to place up to four selected samples in separate movable windows and view them side by side (not illustrated). A "Go to Record" button 644 allows the user to instantly move to any marked sample.

The "Room Settings" button 640 is identical to the Room Setting screen in the Beginner Search 402 (see FIG. 8). However, the Advance Search Room Settings screen 450 has several additional features which are shown in dotted line in FIG. 8. It is now possible to change the height of the wall borders (button 830), and new buttons 832 allow the user to render on only one wall of the room at a time. In addition, a "Computer Only" button 834 makes it possible to view a simplified "computer" sketch 452 (not illustrated) of the room which can then be easily reoriented so that the user can view the room from any possible angle and even add custom window treatments to the room. This additional flexibility makes the Advanced version 450 of the Room Settings screen more powerful.

As can be appreciated, both the Beginner Search 402 and the Advanced Search 404 behave in essentially the same manner and rely upon the same underlying functions in the device. However, the Advanced Search 404 allows the user control over a wider range of parameters so that more sophisticated searching and visualization can take place. Of special importance is the Pantone "Colors" screen 446, which comprises an elegant way to present the entire range of Pantone colors and to search for samples on the basis of exact color matches or on the basis of variable color ranges, each range encompassing the colors of several adjacent pages of the Pantone Textile Color Guide. Any enterprise involving the selection of materials where pattern and color are important can be readily adapted to the present advantage. The use of various fabrics in the apparel business is particularly well suited to the present invention; however, other similar examples will occur to those of ordinary skill in the art.

Those of ordinary skill in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for searching decorative materials samples using a computer, comprising the steps of:
   (a) managing a database storing images of the decorative materials samples, color image data and color descriptive data regarding the decorative materials samples, and also storing textual descriptions of the decorative materials samples, wherein the color image data is derived from scanning a plurality of decorative materials samples with a color sensor, the color descriptive data is derived from analyzing selected regions of each sample with a spectrophotometer, and the color image data for each sample is coordinated with the color descriptive data for the same sample; and
   (b) searching the database to identify a subset of the decorative materials samples having data in common with a user selection of color from a color reference system, and also corresponding to a user selection of textual descriptions.

2. The method of claim 1, wherein the textual descriptions of the decorative materials samples include style and pattern characteristics of the decorative materials samples.

3. The method of claim 1, wherein the color descriptive data are expressed in terms of a color reference system.

4. The method of claim 3, wherein the step of searching the database includes comparing the spectrophotometric measurements expressed in terms of the color reference system to the selection of color from the color reference system.

5. The method of claim 1, further comprising the step of displaying the images of the subset of the decorative materials samples on a display connected to the computer.

6. The method of claim 1, wherein the database further stores paint search data and the database identifies paint that coordinates with the identified subset of decorative materials samples based on the color reference system.

7. An apparatus for searching decorative materials samples, comprising:

(a) a computer;

(b) means, performed by the computer, for managing a database containing images of the decorative materials samples, color image data and color descriptive data regarding the decorative materials samples, and also containing textual descriptions of the decorative materials samples, wherein the color image data is derived from scanning a plurality of decorative materials samples with a color sensor, the color descriptive data is derived from analyzing selected regions of each sample with a spectrophotometer, and the color image data for each sample is coordinated with the color descriptive data for the same sample;

(c) means, performed by the computer, for searching the database to identify a subset of the decorative materials samples containing at least data in common with a user selection of color from a color reference system, and also corresponding to a user selection of textual descriptions.

8. The apparatus of claim 7, wherein the textual descriptions of the decorative materials samples include style and pattern characteristics of the decorative materials samples.

9. The apparatus of claim 7, wherein the color descriptive data are expressed in terms of a color reference system.

10. The apparatus of claim 9, wherein the means for searching the database includes means for comparing the spectrophotometric measurements expressed in terms of the color reference system to the selection of color from the color reference system.

11. The apparatus of claim 7, further comprising means for displaying the images of the subset of the decorative materials samples on a display connected to the computer.

12. The apparatus of claim 7, wherein the database further stores paint search data and the database identifies paint that coordinates with the identified subset of decorative materials samples based on the color reference system.

13. An article of manufacture comprising a computer program carrier readable by a computer and embodying one or more computer programs executable by the computer to perform a method of searching decorative materials samples, the method comprising the steps of:

(a) managing a database storing images of the decorative materials samples, color image data and color descriptive data regarding the decorative materials samples, and also storing textual descriptions of the decorative materials samples, wherein the color image data is derived from scanning a plurality of decorative materials samples with a color sensor, the color descriptive data is derived from analyzing selected regions of each sample with a spectrophotometer, and the color image data for each sample is coordinated with the color descriptive data for the same sample; and (b) searching the database to identify a subset of the decorative materials samples, the subset containing at least data in common with a user selection of color from a color reference system, and also corresponding to a user selection of textual descriptions.

14. The article of manufacture of claim 13, wherein the textual descriptions of the decorative materials samples include style and pattern characteristics of the decorative materials samples.

15. The article of manufacture of claim 13, wherein the color descriptive data are expressed in terms of a color reference system.

16. The article of manufacture of claim 15, wherein the step of searching the database includes comparing the spectrophotometric measurements expressed in terms of the color reference system to the selection of color from the color reference system.

17. The article of manufacture of claim 13, wherein the method further comprises the step of displaying the images of the subset of the decorative materials samples on a computer display.

18. The article of manufacture of claim 13, wherein the database further stores paint search data and the database identifies paint that coordinates with the identified subset of decorative materials samples based on the color reference system.

* * * * *

UNITED STATES PATENT AND TRADEMARK OFFICE
CERTIFICATE OF CORRECTION

PATENT NO.   : 6,122,391
DATED        : September 19, 2000
INVENTOR(S)  : William K. Ringland and Jon C. Kubo It is certified that error appears in the above-identified patent and that said Letters Patent is hereby corrected as shown below:

Column 1,
Line 29, "(colors" should read -- colors --.

Column 2,
Line 3, "call" should read -- can --.

Column 3,
Line 21, "provider" should read -- provide --;
Line 41, "ii" should read -- it --.

Column 4,
Line 45, "arid" should read -- and --.

Column 5,
Line 38, "a," should read -- as --.

Column 8,
Line 12, "Eractal" should read -- fractal --.

Column 10,
Line 5, "on" should read -- one --.

Column 15,
Line 58, ""3submodules" should read -- submodules --.

Column 16,
Line 8, "arid" should read -- and --.

Column 17,
Line 18, "spectrophotoinetric" should read -- spectrophotometric --.

UNITED STATES PATENT AND TRADEMARK OFFICE
CERTIFICATE OF CORRECTION

PATENT NO.   : 6,122,391
DATED        : September 19, 2000
INVENTOR(S)  : William K. Ringland and Jon C. Kubo It is certified that error appears in the above-identified patent and that said Letters Patent is hereby corrected as shown below:

Column 18,
Line 40, "GTJI" should read -- GUI --;
Line 45, after "is" (first occurrence) strike the comma (",").

Column 20,
Line 44, "allowed;" should read -- allows --.

Signed and Sealed this

Fourth Day of June, 2002

Attest:

Attesting Officer

JAMES E. ROGAN
Director of the United States Patent and Trademark Office